United States Patent
Kim et al.

(10) Patent No.: US 12,471,037 B2
(45) Date of Patent: Nov. 11, 2025

(54) METHOD BY WHICH VRU TRANSMITS SAFETY MESSAGE IN WIRELESS COMMUNICATION SYSTEM SUPPORTING SIDELINK, AND APPARATUS THEREFOR

(71) Applicant: LG ELECTRONICS INC., Seoul (KR)

(72) Inventors: Hyeyoung Kim, Seoul (KR); Hakseong Kim, Seoul (KR); Myoungseob Kim, Seoul (KR); Jaeho Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 346 days.

(21) Appl. No.: 18/000,193

(22) PCT Filed: Jun. 1, 2020

(86) PCT No.: PCT/KR2020/007085
§ 371 (c)(1),
(2) Date: Nov. 29, 2022

(87) PCT Pub. No.: WO2021/246539
PCT Pub. Date: Dec. 9, 2021

(65) Prior Publication Data
US 2023/0209476 A1 Jun. 29, 2023

(51) Int. Cl.
*H04W 52/28* (2009.01)
*G08G 1/16* (2006.01)
(Continued)

(52) U.S. Cl.
CPC ............ *H04W 52/28* (2013.01); *G08G 1/166* (2013.01); *H04W 52/14* (2013.01); *H04W 72/25* (2023.01); *B60W 30/0956* (2013.01)

(58) Field of Classification Search
CPC .................................................... H04W 76/15
See application file for complete search history.

(56) References Cited

U.S. PATENT DOCUMENTS

| 2019/0053154 A1 | 2/2019 | Song et al. |
| 2020/0107357 A1 | 4/2020 | Chang et al. |
| 2020/0275243 A1* | 8/2020 | Ueno .................... H04W 40/22 |

FOREIGN PATENT DOCUMENTS

| KR | 10-2017-0044877 | 4/2017 |
| KR | 10-2018-0049709 | 5/2018 |

(Continued)

OTHER PUBLICATIONS

Korean Intellectual Property Office Application No. 10-2022-7042435, Office Action dated Jun. 3, 2024, 8 pages.
(Continued)

*Primary Examiner* — Pamit Kaur
(74) *Attorney, Agent, or Firm* — LEE, HONG, DEGERMAN, KANG & WAIMEY

(57) ABSTRACT

Disclosed are a method by which a VRU transmits a safety message in a wireless communication system, and an apparatus therefor, the method comprising the steps of: transmitting state information to a base station on the basis of mobility information; receiving reconfiguration information about transmission parameters from the base station; and transmitting a safety message on the basis of the reconfiguration information, wherein the state information is included in a UEAssistanceInformation message and transmitted if a collision risk is predicted according to peripheral information and the mobility information, and the safety message is transmitted on the basis of transmission power and a transmission period that are changed according to the reconfiguration information.

13 Claims, 25 Drawing Sheets

(51) Int. Cl.
  *H04W 52/14*    (2009.01)
  *H04W 72/25*    (2023.01)
  *B60W 30/095*   (2012.01)

(56)          References Cited

FOREIGN PATENT DOCUMENTS

KR    10-2019-0017171      2/2019
KR    10-2019-0114871     10/2019
KR    10-2019-0132513     11/2019
KR    10-2020-0041218      4/2020
WO       2020014979        1/2020

OTHER PUBLICATIONS

PCT International Application No. PCT/KR2020/007085, International Search Report dated Feb. 23, 2021, 3 pages.
ZTE, "New Key Issue for Pedestrian UE Communication," 3GPP SA WG2 Meeting #139E (e-meeting), S2-2003936, Jun. 2020, 3 pages.
Tencent, "New KI: V2X communication efficiency for VRU," 3GPP SA WG2 Meeting #139E, S2-2004065, Jun. 2020, 4 pages.

* cited by examiner (a)

(b)

(a)

(b)

(a)

(b)

METHOD BY WHICH VRU TRANSMITS SAFETY MESSAGE IN WIRELESS COMMUNICATION SYSTEM SUPPORTING SIDELINK, AND APPARATUS THEREFOR

CROSS-REFERENCE TO RELATED APPLICATION(S)

This application is the National Stage filing under 35 U.S.C. 371 of International Application No. PCT/KR2020/007085, filed on Jun. 1, 2020, the contents of which is hereby incorporated by reference herein in its entirety.

TECHNICAL FIELD

Embodiments relate to a method for transmitting a safety message by a Vulnerable Road User (VRU) in a wireless communication system supporting sidelink, and more particularly, to a method for transmitting a safety message according to a changed transmission parameter when the VRU detects a risk situation, and an apparatus therefor.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X can be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

SUMMARY

An object of the present disclosure is to provide a method for maximizing the transmission efficiency of a safety message and the safety of a user of the VRU in a risk situation detected by the VRU by notifying a base station of the risk situation and receiving a reconfiguration of a transmission parameter suitable for the risk situation.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

In another aspect of the present disclosure, provided herein is a method for transmitting a safety message by a vulnerable road user (VRU) in a wireless communication system supporting sidelink. The method may include transmitting state information to a base station based on mobility information, receiving reconfiguration information about transmission parameters from the base station, and transmitting a safety message based on the reconfiguration information. The state information may be included and transmitted in a UEAssistanceInformation message when a risk of collision is predicted according to surrounding information and the mobility information. The safety message may be transmitted at a transmission power and transmission interval changed by the reconfiguration information.

Alternatively, the transmission interval may be reduced by the reconfiguration information, and the transmission power may be increased by the reconfiguration information.

Alternatively, the reconfiguration information increases a minimum value of the transmission power for the safety message.

Alternatively, a minimum value of the transmission power for the safety message may be changed to a value corresponding to a maximum value of the transmission power for the safety message by the reconfiguration information.

Alternatively, the safety message may be transmitted at a maximum transmission power by p0-UE-PUSCH-Persistent and p0-NominalPUSCH-Persistent included in the reconfiguration information.

Alternatively, the safety message may be transmitted at a maximum transmission power according to p0SL-V2V and alphaSL-V2V included in the reconfiguration information.

Alternatively, the reconfiguration information may be included in an RRCConnectionReconfiguration message and transmitted through RRC signaling.

Alternatively, the transmission interval of the safety message may be set to a shortest transmission interval among a plurality of transmission intervals configurable for the VRU by the base station according to the reconfiguration information.

Alternatively, the surrounding information may be acquired from at least one of a cooperative awareness message (CAM), a decentralised environmental notification message (DENM), or a threat notification message (TNM).

Alternatively, the surrounding information is acquired from a VRU public safety service center.

Alternatively, the VRU transmits the UEAssistanceInformation message including information indicating release of the risk situation to the base station when the detected risk situation ends.

In another aspect of the present disclosure, provided herein is a method for reconfiguring a transmission parameter for a safety message by a base station in a wireless communication system supporting sidelink. The method may include receiving, from a first vulnerable road user (VRU), state information indicating detection of a risk situation, transmitting, to the first VRU, first reconfiguration information for reconfiguring a transmission parameter for a safety message of the first VRU based on the state information, and transmitting, to a second VRU, second reconfiguration information for reconfiguring a transmission parameter for a safety message of a second VRU, the second VRU not having transmitted the state information. The state information may be received through a UEAssistanceInformation message. The first reconfiguration information may decrease a transmission interval for the safety message of the first VRU while increasing a transmission power for the safety message of the first VRU, and the second reconfiguration information may increase a transmission interval for the safety message of the second VRU while decreasing a transmission power for the safety message of the second VRU.

In another aspect of the present disclosure, provided herein is a vulnerable road user (VRU) for transmitting a safety message in a wireless communication system supporting sidelink. The VRU may include a radio frequency (RF) transceiver, and a processor connected to the RF transceiver. The processor may be configured to transmit state information to a base station based on mobility information, receive reconfiguration information about transmission parameters from the base station, and transmit a safety message based on the reconfiguration information. The state information may be included and transmitted in a UEAssistanceInformation message when a risk of collision is predicted according to surrounding information and the mobility information. The safety message may be transmitted at a transmission power and transmission interval changed by the reconfiguration information.

In another aspect of the present disclosure, provided herein is a chipset for transmitting a safety message in a wireless communication system supporting sidelink. The chipset may include at least one processor, and at least one memory operatively connected to the at least one processor and configured to cause, when executed, the at least one processor to perform an operation. The operation may include transmitting state information to a base station based on mobility information, receiving reconfiguration information about transmission parameters from the base station, and transmitting a safety message based on the reconfiguration information. The state information may be included and transmitted in a UEAssistanceInformation message when a risk of collision is predicted according to surrounding information and the mobility information. The safety message may be transmitted at a transmission power and transmission interval changed by the reconfiguration information.

Alternatively, the processor may control a driving mode of a device connected to the chipset based on the state information.

According to various embodiments, the transmission efficiency of a safety message and the safety of a user of a VRU may be maximally ensured in a risk situation detected by the VRU by notifying a base station of the risk situation and receiving a reconfiguration of a transmission parameter suitable for the risk situation.

Effects to be achieved by embodiment(s) are not limited to what has been particularly described hereinabove and other effects not mentioned herein will be more clearly understood by persons skilled in the art to which embodiment(s) pertain from the following detailed description.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

DETAILED DESCRIPTION

Figure 1:
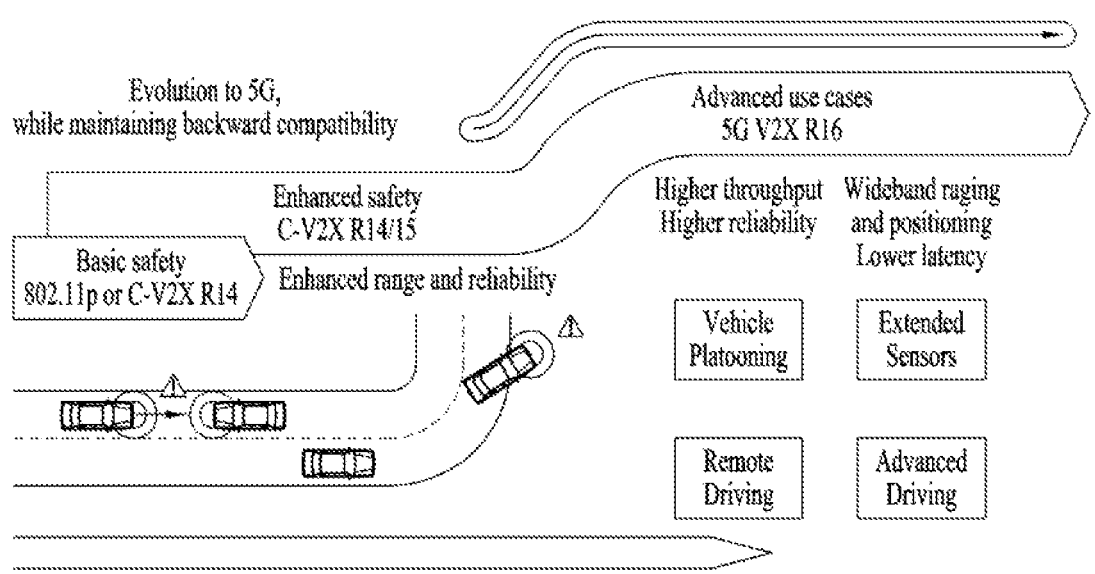
FIG. 1 is a diagram for explaining by comparing V2X communication based on RAT before NR and V2X communication based on NR

The wireless communication system is a multiple access system that supports communication with multiple users by sharing available system resources (eg, bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR can utilize all available spectrum resources, from low frequency bands below 1 GHz to intermediate frequency bands from 1 GHz to 10 GHz and high frequency (millimeter wave) bands above 24 GHz.

Figure 2:
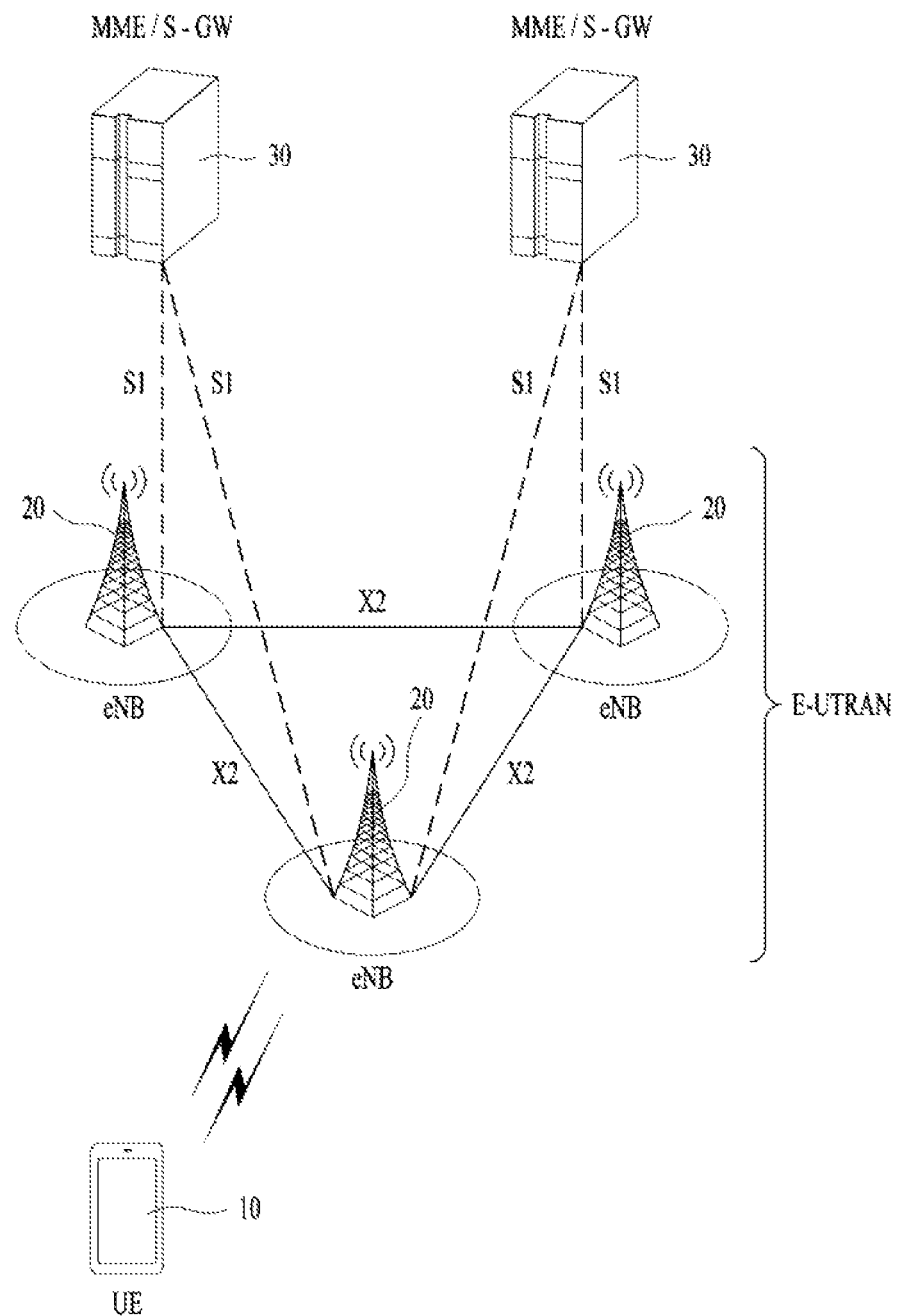
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes base stations (BSs) (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
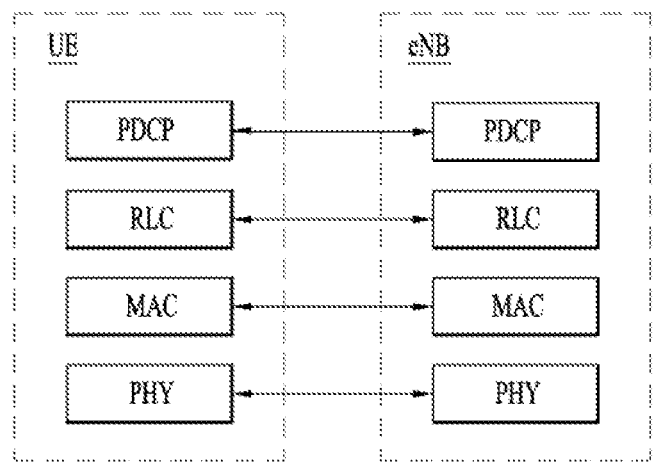
FIG. 3 illustrates a user-plane radio protocol architecture to which embodiment(s) are applicable.

FIG. 3 illustrates a user-plane radio protocol architecture to which the present disclosure is applicable.

Figure 4:
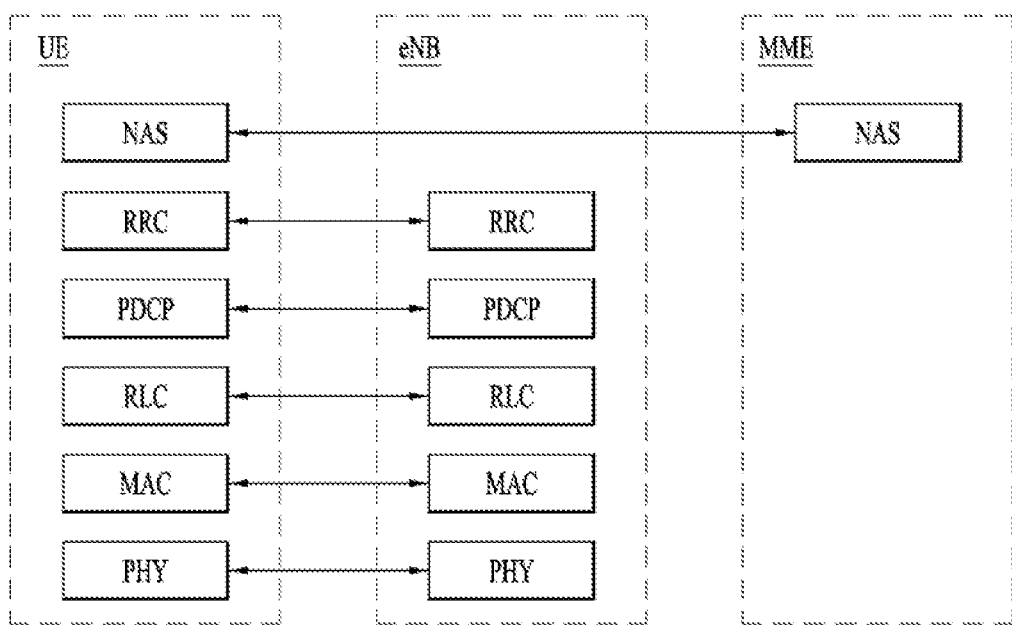
FIG. 4 illustrates a control-plane radio protocol architecture to which embodiment(s) are applicable.

FIG. 4 illustrates a control-plane radio protocol architecture to which the present disclosure is applicable. A user plane is a protocol stack for user data transmission, and a control plane is a protocol stack for control signal transmission.

Referring to FIGS. 3 and 4, the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC CONNECTED state, and otherwise, the UE is placed in RRC IDLE state. In NR, RRC INACTIVE state is additionally defined. A UE in the RRC INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbols in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 5:
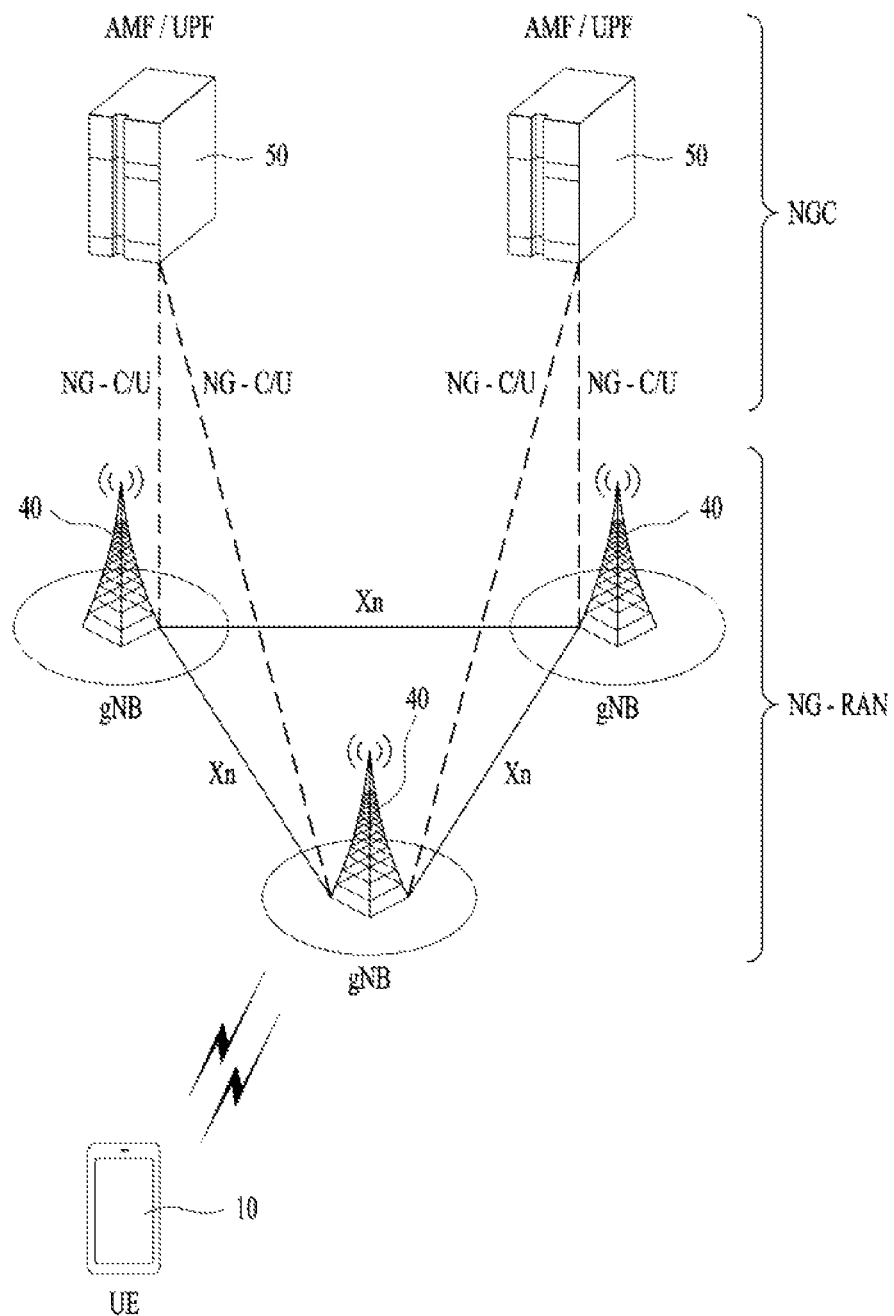
FIG. 5 illustrates the structure of an NR system to which embodiment(s) are applicable.

FIG. 5 illustrates the structure of a NR system to which the present disclosure is applicable.

Referring to FIG. 5, a next generation radio access network (NG-RAN) may include a next generation Node B (gNB) and/or an eNB, which provides user-plane and control-plane protocol termination to a UE. In FIG. 5, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 6:
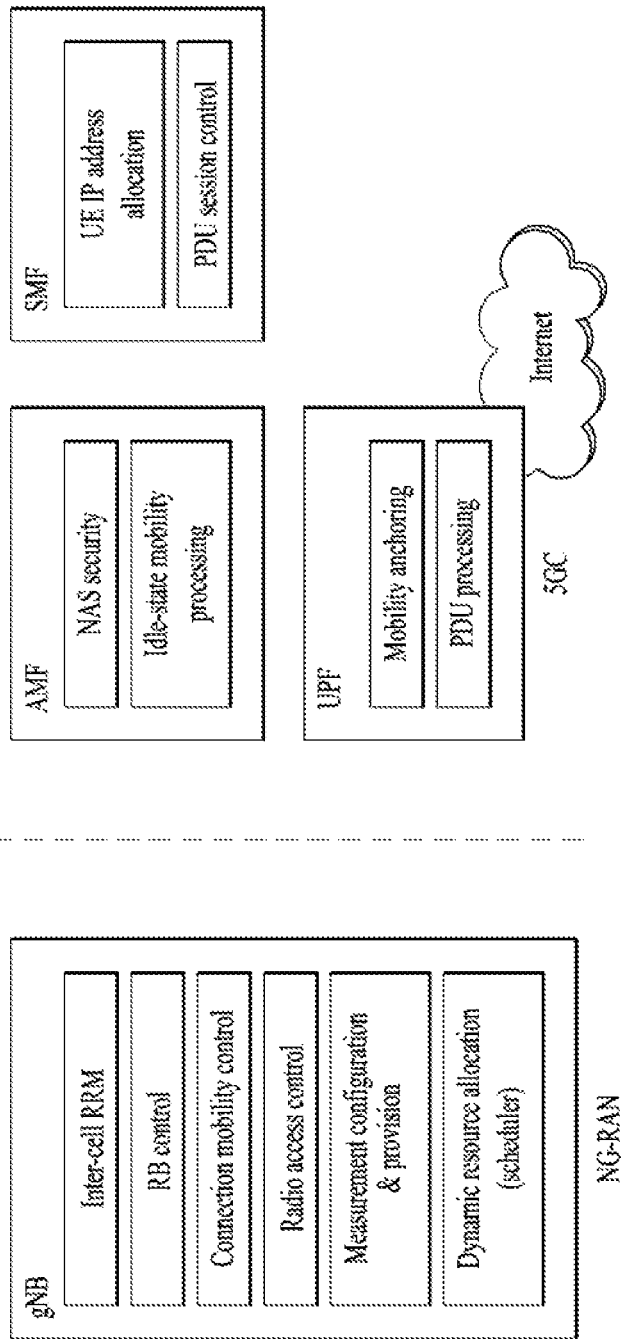
FIG. 6 illustrates functional split between an NG-RAN and a 5GC to which embodiment(s) are applicable.

FIG. 6 illustrates functional split between the NG-RAN and the 5GC to which the present disclosure is applicable.

Referring to FIG. 6, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 7:
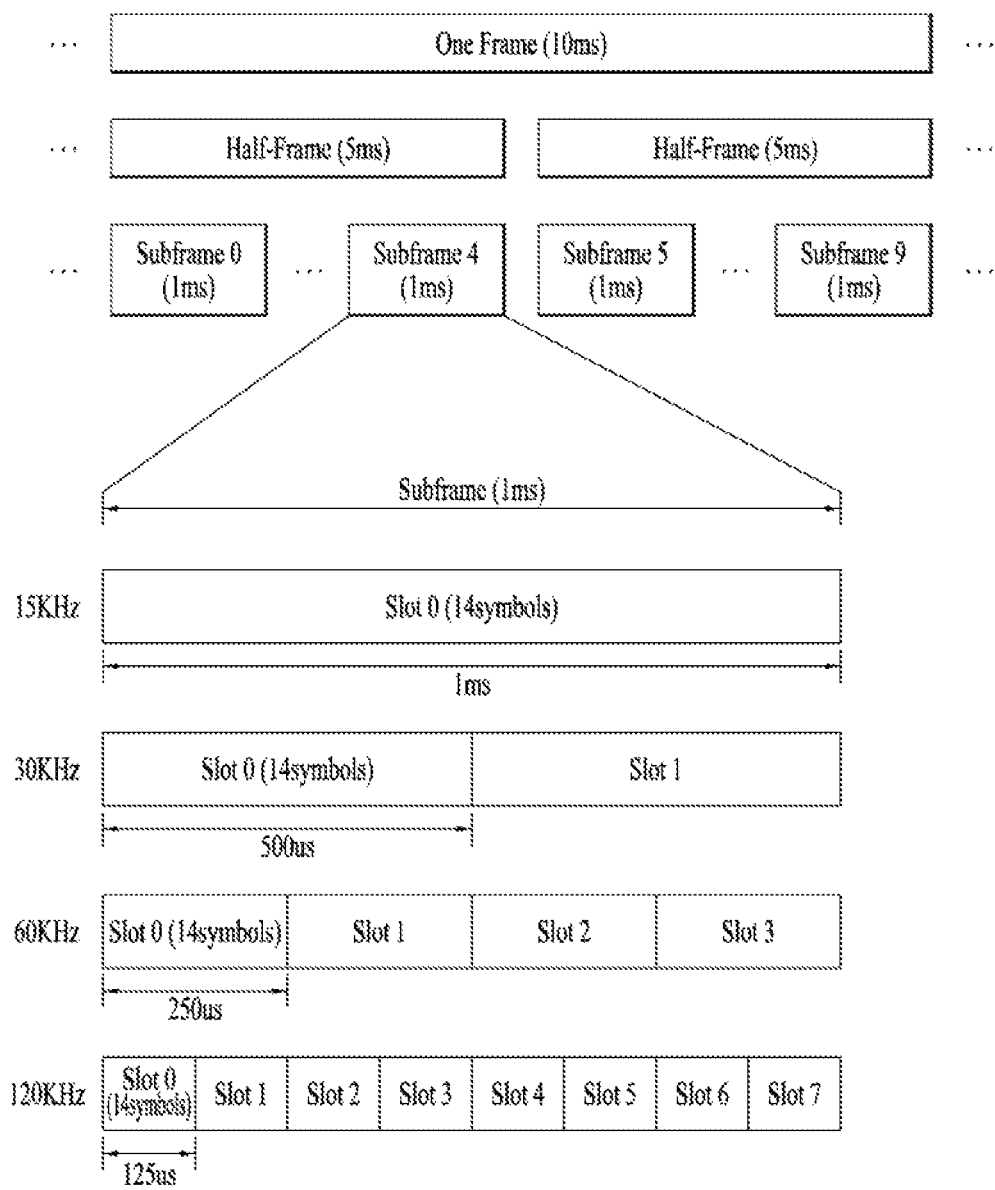
FIG. 7 illustrates the structure of an NR radio frame to which embodiment(s) are applicable.

FIG. 7 illustrates the structure of a NR radio frame to which the present disclosure is applicable.

Referring to FIG. 7, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15*2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 8:
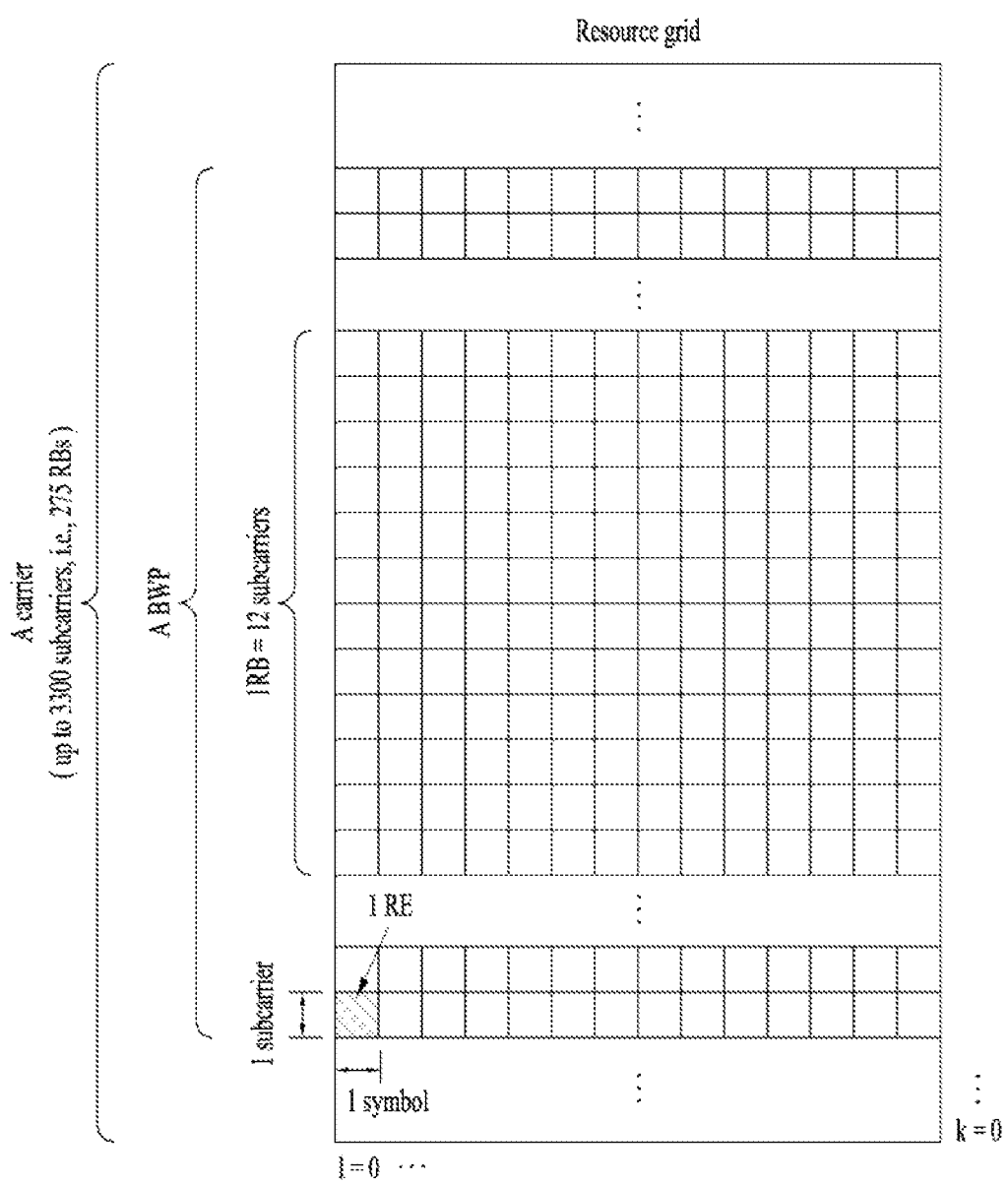
FIG. 8 illustrates the slot structure of an NR frame to which embodiment(s) are applicable.

FIG. 8 illustrates the slot structure of a NR frame to which the present disclosure is applicable.

Referring to FIG. 8, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE), and one complex symbol may be mapped thereto.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 9:
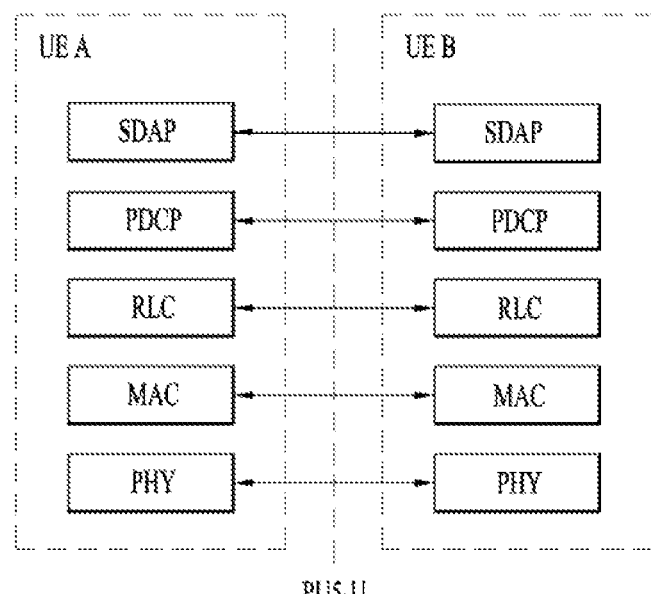
FIG. 9 illustrates a radio protocol architecture for SL communication.
Figure 9:
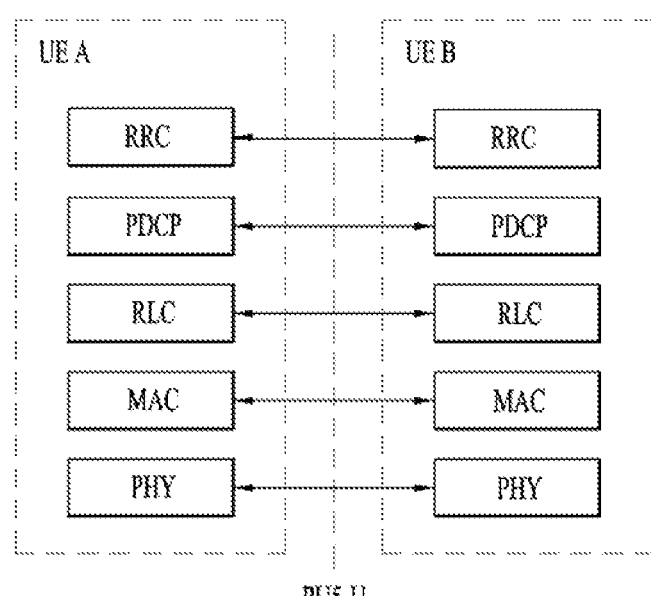

FIG. 9 illustrates a radio protocol architecture for SL communication. Specifically, FIG. 9-(a) shows a user plane protocol stack of NR, and FIG. 9-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 10:
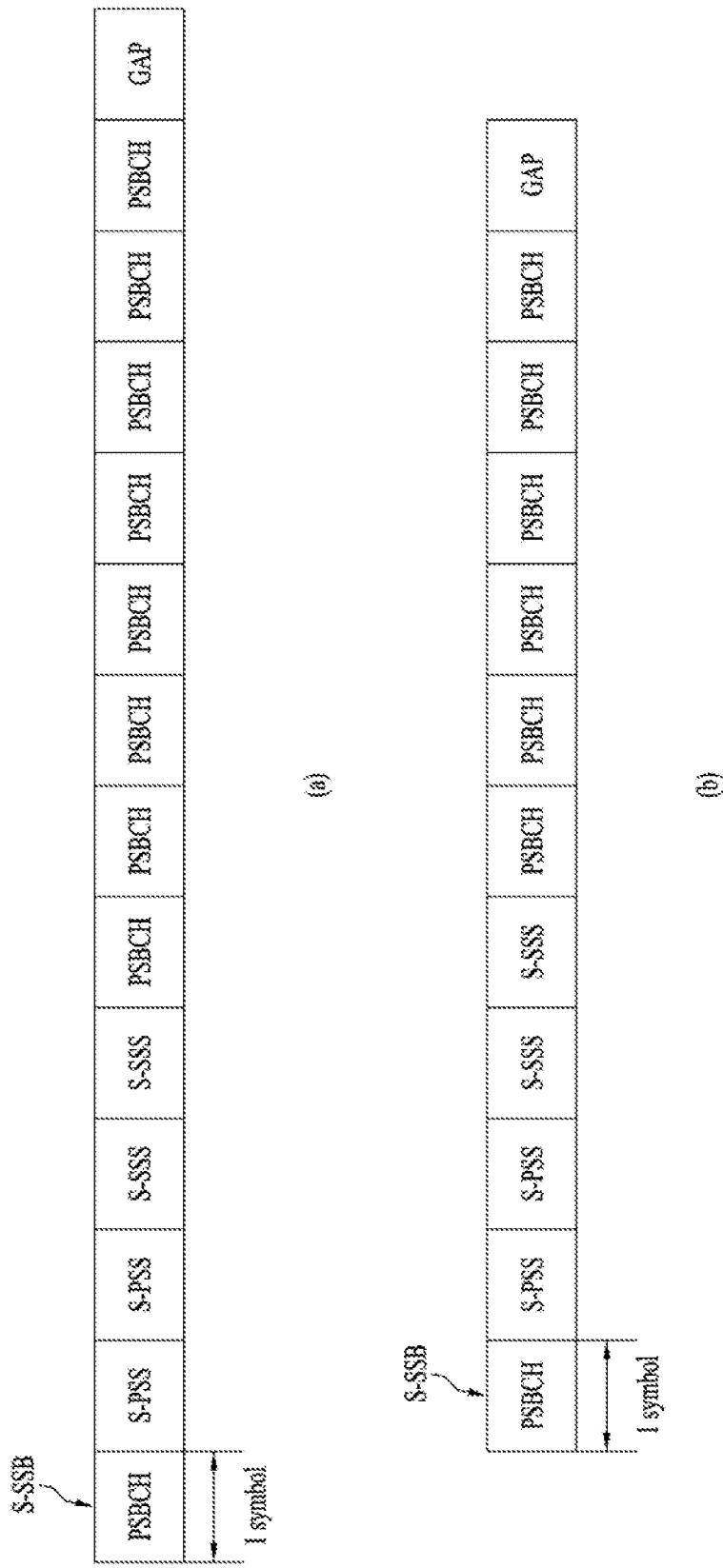
FIG. 10 shows the structures of an S-SSB according to CP types.

FIG. 10 illustrates the structures of an S-SSB according to CP types. FIG. 10-(a) shows the structure of the S-SSB when the CP type is NCP.

Figure 20:
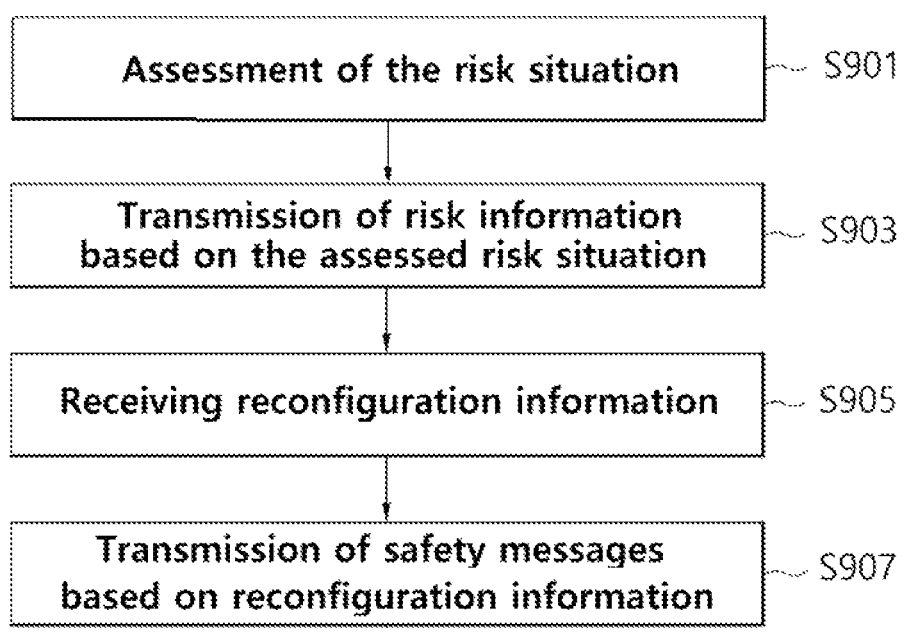
FIG. 20 is a flowchart illustrating a method for transmitting a safety message by a VRU.

For example, the structure of the S-SSB, that is, the order of symbols to which the S-PSS, S-SSS, and PSBCH are mapped in the S-SSB transmitted by the transmitting UE when the CP type is NCP may be shown in FIG. 20.

FIG. 10-(b) shows the structure of the S-SSB when the CP type is ECP.

For example, when the CP type is ECP, the number of symbols to which the transmitting UE maps the PSBCH after the S-SSS in the S-SSB may be 6, unlike in FIG. 20. Accordingly, the coverage of the S-SSB may differ between the CP types, NCP and ECP.

Each SLSS may have an SL synchronization identifier (SLSS ID).

For example, in the case of LTE SL or LTE V2X, the value of the SLSS ID may be defined based on a combination of two different S-PSS sequences and 168 different S-SSS sequences. For example, the number of SLSS IDs may be 336. For example, the value of the SLSS ID may be any one of 0 to 335.

For example, in the case of NR SL or NR V2X, the value of the SLSS ID may be defined based on a combination of two different S-PSS sequences and 336 different S-SSS sequences. For example, the number of SLSS IDs may be 672. For example, the value of the SLSS ID may be any one of 0 to 671. For example, one S-PSS of the two different S-PSSs may be associated with in-coverage, and the other S-PSS may be associated with out-of-coverage. For example, SLSS IDs of 0 to 335 may be used in in-coverage, and SLSS IDs of 336 to 671 may be used in out-of-coverage.

In order to improve the S-SSB reception performance of the receiving UE, the transmitting UE needs to optimize the transmit power according to the characteristics of respective signals constituting the S-SSB. For example, according to the peak to average power ratio (PAPR) of each signal constituting the S-SSB, the transmitting UE may determine the value of maximum power reduction (MPR) for each signal. For example, when the PAPR differs between the S-PSS and the S-SSS which constitute the S-SSB, the transmitting UE may apply an optimal MPR value to transmission of each of the S-PSS and the S-SSS in order to improve the S-SSB reception performance of the receiving UE. Also, for example, in order for the transmitting UE to perform an amplification operation on each signal, a transition period may be applied. The transition period may reserve a time required for the transmitter amplifier of the transmitting UE to perform a normal operation at the boundary where the transmit power of the transmitting UE varies. For example, in the case of FR1, the transition period may be 10 μs. For example, in the case of FR2, the transition period may be 5 μs. For example, a search window in which the receiving UE is to detect the S-PSS may be 80 ms and/or 160 ms.

Figure 11:
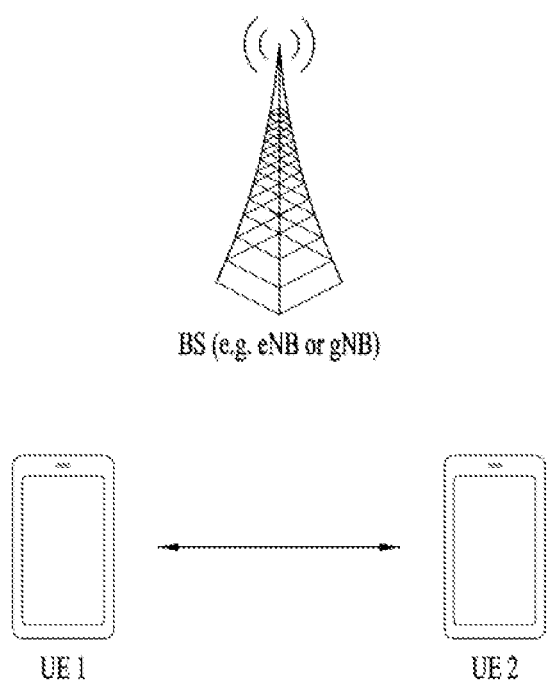
FIG. 11 illustrates UEs performing V2X or SL communication.

FIG. 11 illustrates UEs performing V2X or SL communication.

Referring to FIG. 11, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 12:
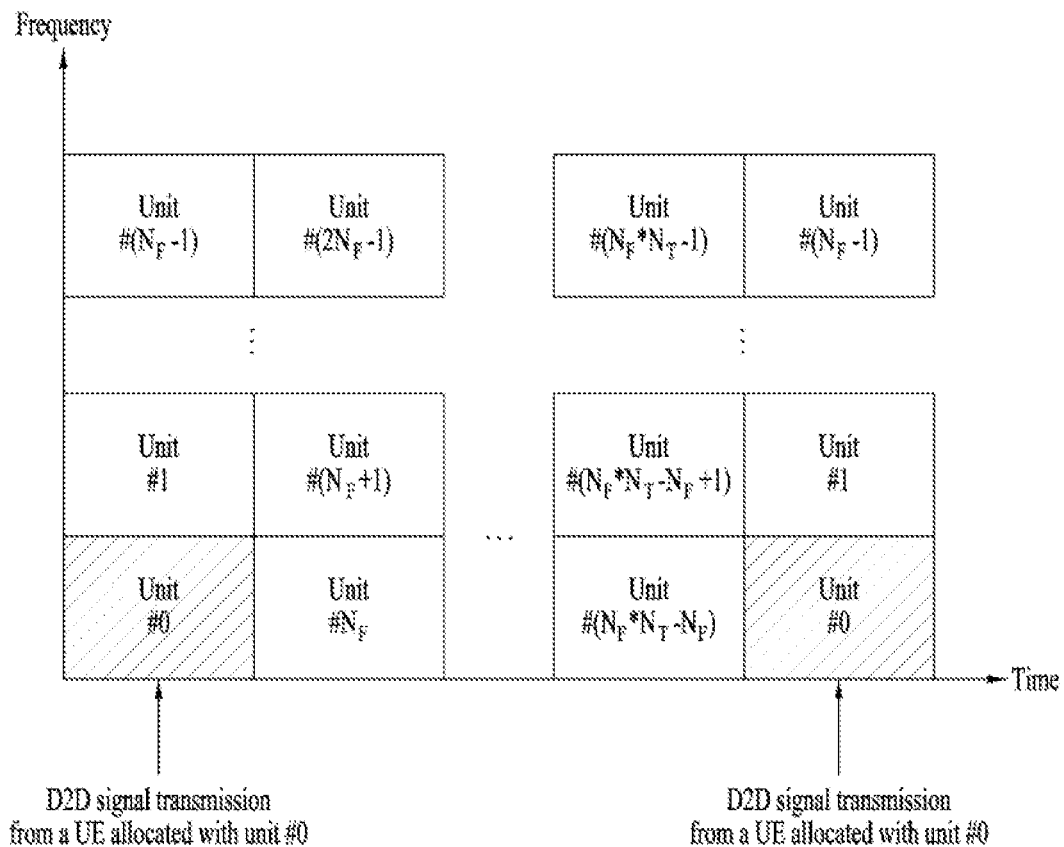
FIG. 12 illustrates resource units for V2X or SL communication.

FIG. 12 illustrates resource units for V2X or SL communication.

Referring to FIG. 12, the frequency resources of a resource pool may be divided into NF sets, and the time resources of the resource pool may be divided into NT sets. Accordingly, a total of NF*NT resource units may be defined in the resource pool. FIG. 12 shows an exemplary case where the resource pool is repeated with a periodicity of NT subframes.

As shown in FIG. 12, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 13:
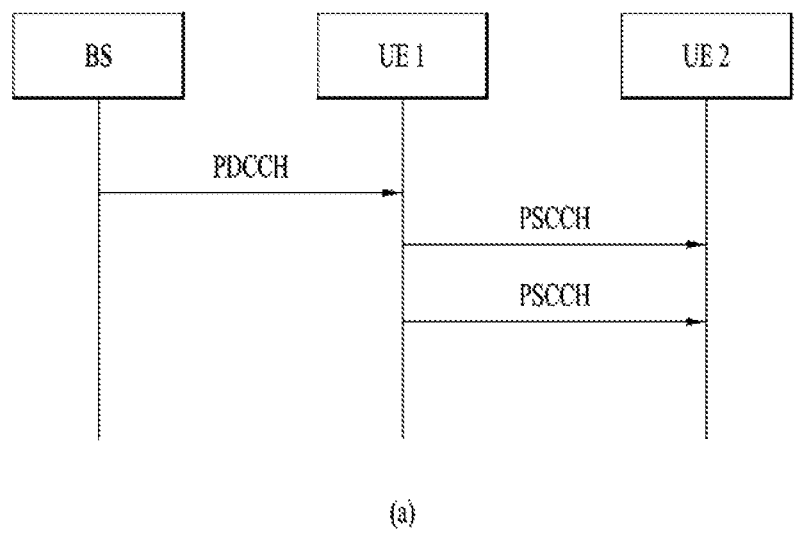
FIG. 13 illustrates a procedure in which UEs perform V2X or SL communication according to a transmission mode.
Figure 13:
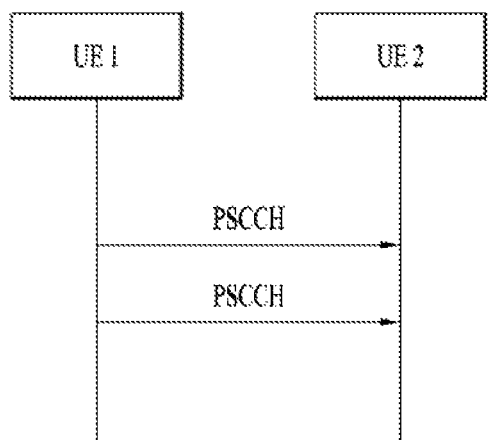

FIG. 13 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 13-(a) illustrates a UE operation related to LTE transmission mode 1 or LTE transmission mode 3. Alternatively, for example, FIG. 24-(a) illustrates a UE operation related to NR resource allocation mode 1. For example, LTE transmission mode 1 may be applied to general SL communication, and LTE transmission mode 3 may be applied to V2X communication.

For example, FIG. 13-(b) illustrates a UE operation related to LTE transmission mode 2 or LTE transmission mode 4. Alternatively, for example, FIG. 24-(b) illustrates a UE operation related to NR resource allocation mode 2.

Referring to FIG. 13-(a), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may represent a slot offset between DCI reception and a first SL transmission scheduled by DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 13-(b), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

PSSCH and/or PSCCH related resource allocation information, for example, the positions/number of time/frequency resources, resource reservation information (e.g., periodicity); and/or SL CSI report request indicator or SL (L1) RSRP (and/or SL (L1) RSRQ and/or SL (L1) RSSI) report request indicator; and/or SL CSI transmission indicator (or SL (L1) RSRP (and/or SL (L1) RSRQ and/or SL (L1) RSSI) information transmission indicator) (on PSSCH); and/or MCS information; and/or transmit power information; and/or L1 destination ID information and/or L1 source ID information; and/or SL HARQ process ID information; and/or new data indicator (NDI) information; and/or redundancy version (RV) information; and/or (transmission traffic/packet related) QoS information; e.g., priority information;

and/or

SL CSI-RS transmission indicator or information on the number of (transmitted) SL CSI-RS antenna ports;

Location information about the transmitting UE or location (or distance/area) information about a target receiving UE (to which a request for SL HARQ feedback is made); and/or information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Figure 14:
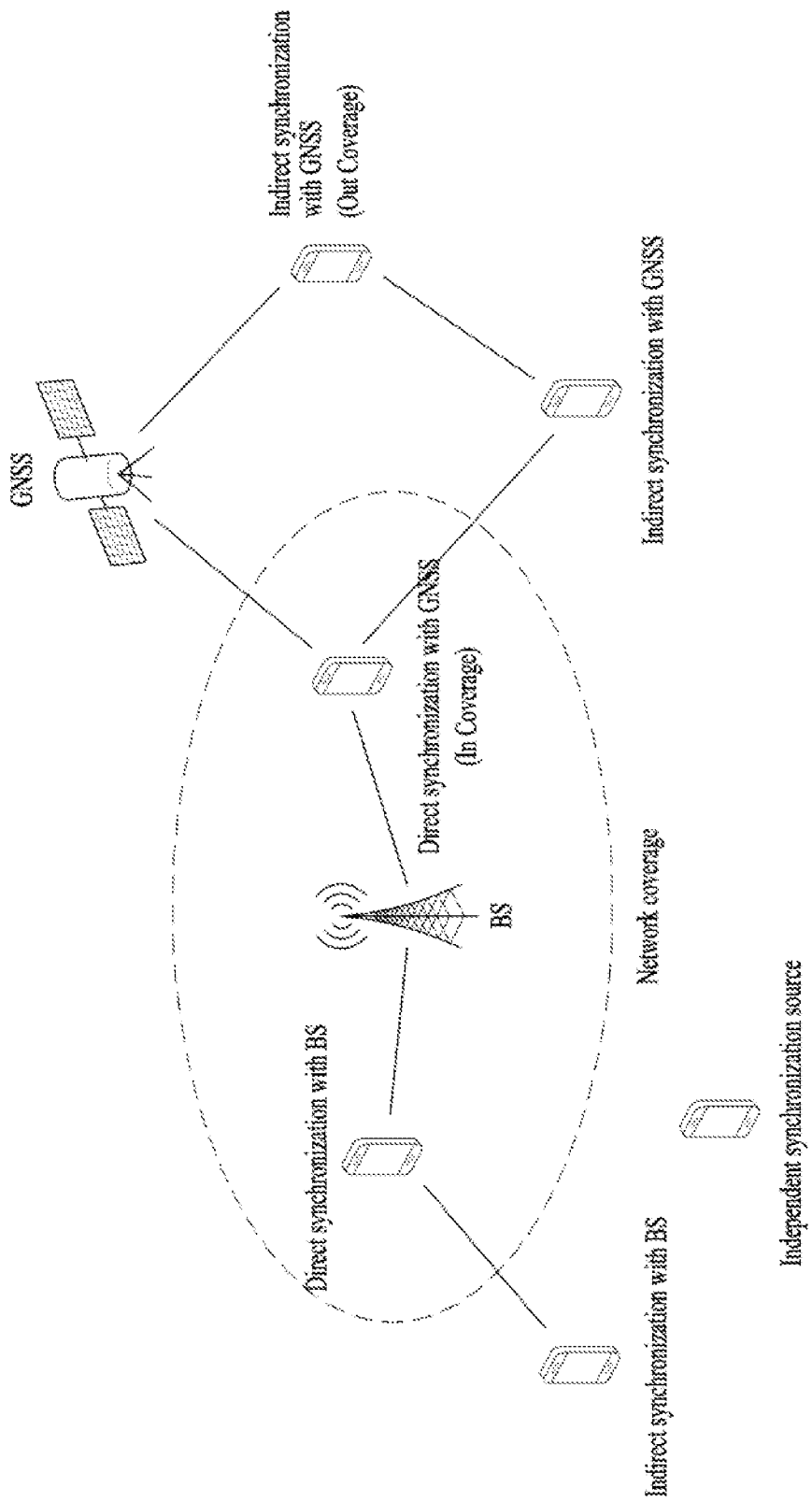
FIG. 14 illustrates a V2X synchronization source or synchronization reference to which embodiments(s) are applicable.

FIG. 14 illustrates a V2X synchronization source or reference to which the present disclosure is applicable.

Referring to FIG. 14, in V2X, a UE may be synchronized with a GNSS directly or indirectly through a UE (within or out of network coverage) directly synchronized with the GNSS. When the GNSS is configured as a synchronization source, the UE may calculate a direct subframe number (DFN) and a subframe number by using a coordinated universal time (UTC) and a (pre)determined DFN offset.

Alternatively, the UE may be synchronized with a BS directly or with another UE which has been time/frequency synchronized with the BS. For example, the BS may be an eNB or a gNB. For example, when the UE is in network coverage, the UE may receive synchronization information provided by the BS and may be directly synchronized with the BS. Thereafter, the UE may provide synchronization information to another neighboring UE. When a BS timing is set as a synchronization reference, the UE may follow a cell associated with a corresponding frequency (when within the cell coverage in the frequency), a primary cell, or a serving cell (when out of cell coverage in the frequency), for synchronization and DL measurement.

The BS (e.g., serving cell) may provide a synchronization configuration for a carrier used for V2X or sidelink communication. In this case, the UE may follow the synchronization configuration received from the BS. When the UE fails in detecting any cell in the carrier used for the V2X or sidelink communication and receiving the synchronization configuration from the serving cell, the UE may follow a predetermined synchronization configuration.

Alternatively, the UE may be synchronized with another UE which has not obtained synchronization information directly or indirectly from the BS or GNSS. A synchronization source and a preference may be preset for the UE. Alternatively, the synchronization source and the preference may be configured for the UE by a control message provided by the BS.

A sidelink synchronization source may be related to a synchronization priority. For example, the relationship between synchronization sources and synchronization priorities may be defined as shown in Tables 5 and 6. Tables 5 and 6 are merely an example, and the relationship between synchronization sources and synchronization priorities may be defined in various manners.

TABLE 5

| Priority | GNSS-based synchronization | BS-based synchronization (eNB/gNB-based synchronization) |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

TABLE 6

| Priority | GNSS-based synchronization | eNB/gNB-based synchronization |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | BS | GNSS |
| P4 | All UEs directly synchronized with BS | All UEs directly synchronized with GNSS |
| P5 | All UEs indirectly synchronized with BS | All UEs indirectly synchronized with GNSS |
| P6 | Remaining UE(s) with low priority | Remaining UE(s) with low priority |

In Table 5 or Table 6, P0 may denote the highest priority, and P6 may denote the lowest priority. In Table 5 or Table 6, the BS may include at least one of a gNB or an eNB.

Whether to use GNSS-based synchronization or BS-based synchronization may be (pre)determined. In a single-carrier operation, the UE may derive its transmission timing from an available synchronization reference with the highest priority.

Tx/Rx Beam Sweep

When a very high frequency such as mmWave is used, beamforming may be generally used in order to overcome a pathloss. In order to use beamforming, the best beam pair should be detected from among several beam pairs between a transmitter and a receiver. This operation may be called beam acquisition or beam tracking from the receiver perspective. In particular, analog beamforming is used for mmWave. Accordingly, in the operation of beam acquisition or beam tracking, a vehicle needs to perform beam sweeping of switching between beams in different directions at different times, using an antenna array thereof.

Change of VRU Transmission Factor for Each Situation Using N2P Control Signal

Vulnerable road user (VRU) devices may periodically transmit the state information thereon to the surroundings by a personal safety message (PSM). As a VRU notifies the surroundings of the state thereof through periodic transmission of the PSM, vehicles traveling thereraround may secure the safety of the VRU by performing safe driving according to recognition of the VRU. However, the conventional VRU merely transmits a periodic message in a unidirectional broadcast manner, and has no mechanism to ensure that the state of the VRU is frequently reported in order to enhance the safety guarantee when the VRU is in a risk situation. Proposed below is a method for changing a transmission factor of an access layer that may reduce interference and increase the probability of transmission of the PSM of the VRU while minimizing the use of radio resources when it is necessary to change the transmission periodicity for securing safety of the VRU.

When a VRU enters a risk zone or is in an emergency, the VRU may transmit a signal by shortening the transmission interval of VRU information or by increasing the power level. In this case, the safety of the VRU may be efficiently secured. Alternatively, when the VRU escapes from the risk zone or the danger is removed, the VRU may increase the transmission interval and decrease the power level to minimize unnecessary waste of radio resources and power. However, it may be inefficient to allow all VRUs in a risk situation to increase the transmission power or decrease the transmission interval. Therefore, when multiple VRUs are located in the same risk zone, operation priorities may be configured therefor according to an emergency or the type and state of the VRU. For example, an eNB may receive related information such as the types and states of the VRUs over a control signal, and may set the highest priority for a VRU determined to be in the highest-level emergency based on the received related information. Thereby, safety may be more effectively ensured for the VRU in the highest-level emergency.

Specifically, VRUs may receive, from the public safety center, a notification that the VRUs have entered a risk zone (in relation to the VRU public safety service using a UU interface for zone-based transmission of risk information), or may determine and recognize that the VRUs are in an emergency. In this case, the VRU may transmit, via the UU interface (or to the BS), a control signal including a field indicating an emergency, a field indicating the cause (or detailed cause) of the emergency, and/or a field indicating a specific emergency. The control signal may include request information for requesting an increase of transmission power and a decrease of a transmission interval. The eNB (or BS) may recognize the situation of the VRU from the fields included in the control signal, set a priority corresponding to the recognized situation, and re-set the power level and transmission interval corresponding to the priority. Thereafter, the eNB may deliver information on the set priority, the re-set power level, and the transmission interval to the VRU. In addition, the eNB may adjust the transmission interval and the power level while lowering the priorities for other VRUs that are not in an emergency even when there is no separate request received, thereby reducing interference with the VRU in the emergency and occupancy of radio resources by the other VRUs. Accordingly, the efficiency of signal transmission from the VRU may be maximized.

In addition, when the VRU is released from the emergency, the VRU may transmit information about the release of the emergency and the changed transmission interval to the access layer via the UU interface. Alternatively, the eNB receiving the information related to the release of the emergency may change and reset the transmission interval and power level to values corresponding to normal situations.

Figure 15:
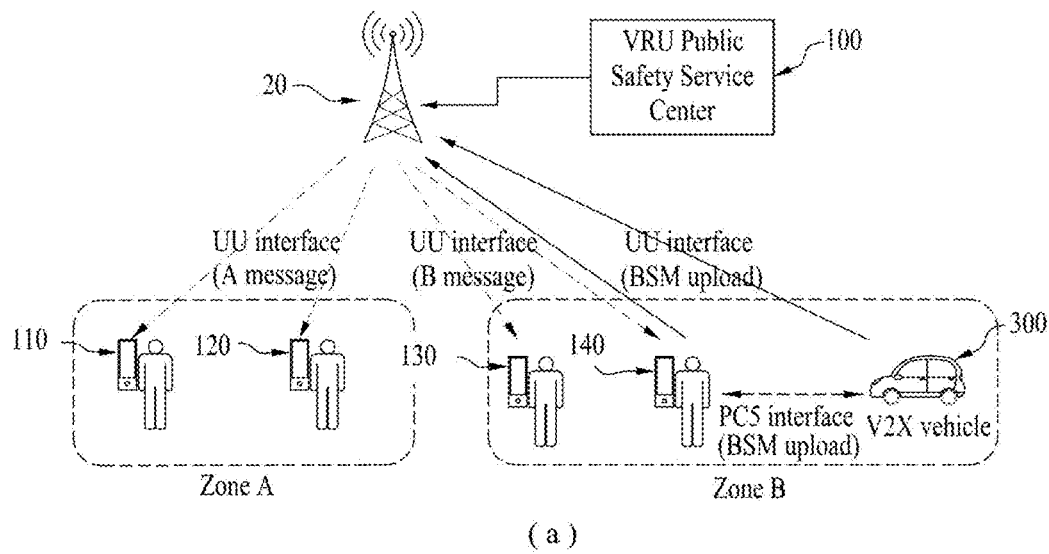
FIG. 15 is a diagram illustrating a method for receiving risk information from a VRU public safety service using a UU interface.
Figure 15:
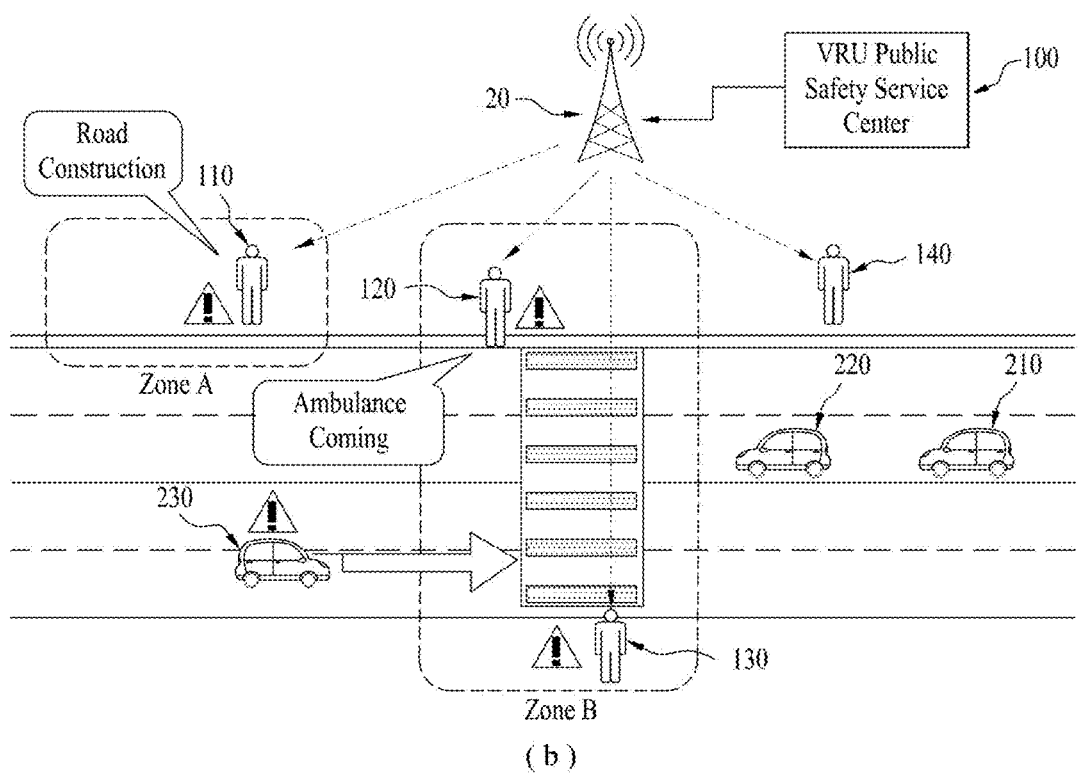

FIG. 15 is a diagram illustrating a method for receiving risk information from a VRU public safety service using a UU interface.

Referring to FIG. 15-(a), when a VRU enters a risk zone, it may receive related risk information from the VRU public safety service center via a UU interface. A system for providing the risk information includes a VRU public safety service center 100 and VRU devices 110, 120, 130, and 140 capable of providing a public safety service. The VRU public safety service center 100 and the VRU devices 110, 120, 130, and 140 are connected to each other by the UU interface via the eNB 20. In order to provide the safety service of the VRU in real time, the VRU public safety service center 100 may receive a basic safety message (BSM) from a nearby traveling vehicle 200 via the UU interface, or a VRU may receive the BSM from the vehicle 200 (through PC-5 communication) and deliver the received BSM to the public safety service center 100 via the UU interface.

Referring to FIG. 15-(b), the VRU public safety service center 100 may receive ambulance driving information or construction site information in advance from a system such as the national safety net or the Ministry of Land, Infrastructure and Transport. The public safety service center 100 may generate zone-based risk information based on the driving information or construction site information, and transmit the generated risk information to a VRU located in a corresponding zone via the UU interface. For example, when a sidewalk is under construction in Zone A, the VRU public safety service center 100 may transmit risk information related to the construction to the VRU 110 moving in Zone A. Alternatively, when an emergency vehicle 230 (e.g., an ambulance, fire engine, or police car) is traveling toward Zone B, the VRU public safety service centre 100 may provide information related to the existence of the emergency vehicle to VRUs which are in Zone B and/or in the vicinity of Zone B such that the VRUs may recognize that the emergency vehicle may cause a danger by traveling without observing the traffic signal. On the other hand, a VRU 140 located outside the risk zone determined by the VRU public safety service center 100 may not receive the message related to the safety information from the VRU public safety service center 100, and thus may recognize that there is no special issue in the corresponding zone.

Figure 16:
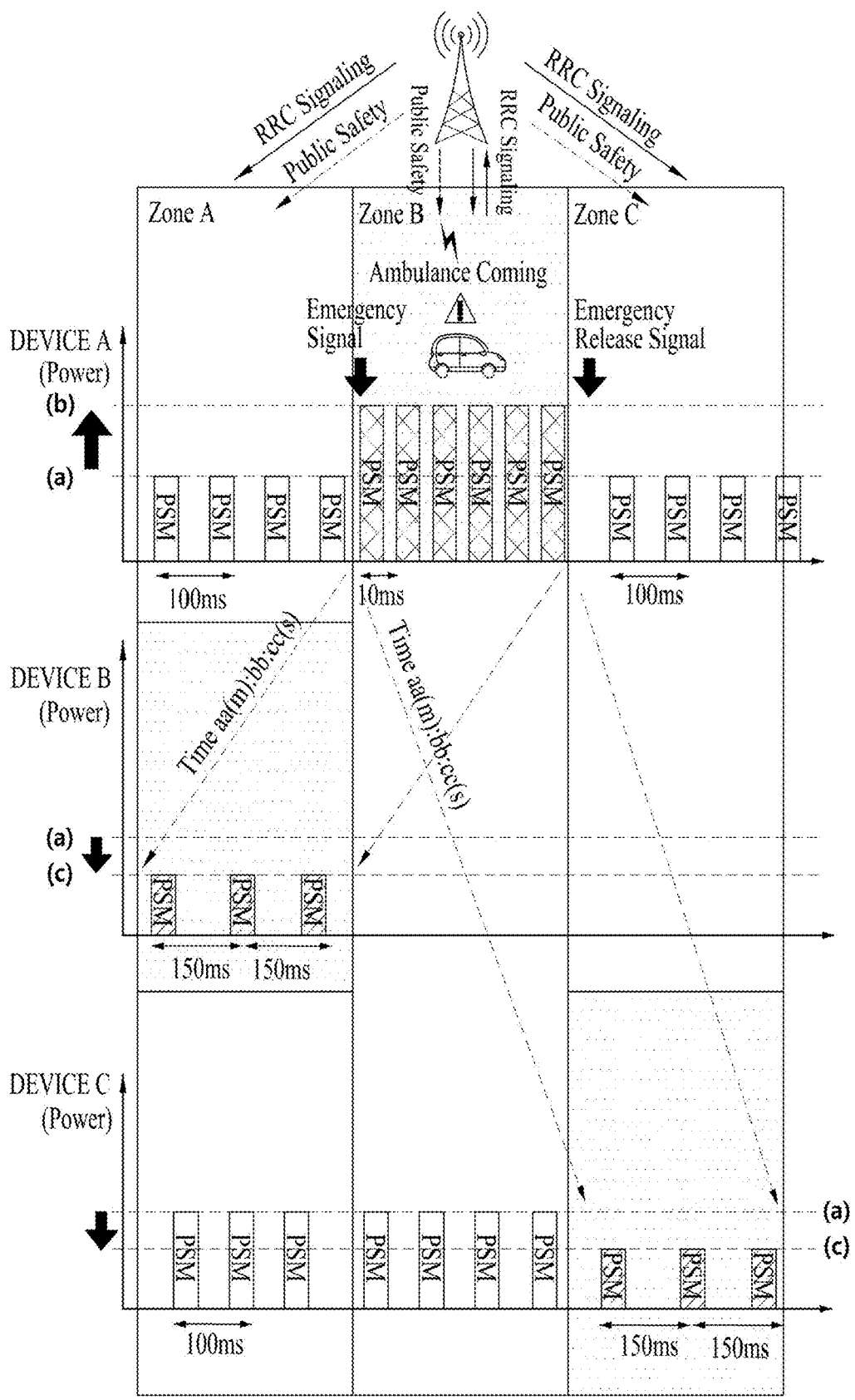
FIG. 16 is a diagram illustrating a method for receiving a reconfiguration of a transmission parameter for a safety message by a VRU.

FIG. 16 is a diagram illustrating a method for receiving a reconfiguration of a transmission parameter for a safety message by a VRU.

Referring to FIG. 16, upon recognizing the entry of an emergency vehicle (ambulance) into a risk zone (Zone B) based on the received risk information, a first VRU (device A) may shorten the PSM transmission interval to ensure safety, and may inform the eNB of the emergency, a detail cause, and a detailed situation via the UU interface while requesting that the transmission interval for the access layer should be changed and that the maximum power should be ensured. In this case, the eNB may recognize the situation, the detailed cause, the detailed situation, and the like, set a priority, and change the factors (or transmission parameters) of the transmission interval and power level for the VRU. In addition, when there is a shortage of radio resources or it is necessary to reduce interference, the eNB may reconfigure transmission parameters for a second VRU (device B or device C) located in an area adjacent to the risk zone or a third VRU located in a risk zone in a situation of a low risk level (that is, it may reconfigure the transmission parameters to increase the transmission interval or decrease the power level), and inform the second VRU or the third VRU that the transmission parameters are reconfigured according to the risk situation for the first VRU.

In addition, even when information about the risk zone is not received through the VRU public safety service, the VRU or the application of the VRU may recognize the emergency by itself and perform the procedure of changing the transmission parameters for message transmission as described above automatically or by a report operation through the HMI (Human-machine interface). When the VRU recognizes the emergency and performs the report operation automatically or through the HMI, the same procedure as above may be performed.

Specifically, the application of the VRU may receive a basic safety message (BSM) and a PSM from a nearby vehicle, bicycle or kickboard, and acquire the location and movement information about the nearby vehicle, bicycle, or kickboard based on the received message, and perform a risk assessment based on the acquired movement information and the location and movement information about the application. When it is determined that there is a risk of collision based on the risk assessment, the procedure of changing the transmission parameters may be performed. This operation may be equally applied to prediction of a collision by a vehicle having the same application other than the VRU. The V2V (Vehicle To Vehicle) application specified in SAE J2945-1 (On-Board System Requirements for V2V Safety Communications) defining the requirements for UE protocol standard satisfaction, information reliability, and BSM transmission-related requirements is disclosed below.

Emergency Electronic Brake Lights (EEBL)
　Forward Crash Warning (FCW)
Blind Spot Warning/Lane Change Warning (BSW/LCW)
　Intersection Movement Assist (IMA)
Left Turn Assist (LTA)
　Control Loss Warning (CLW)

Figure 17:
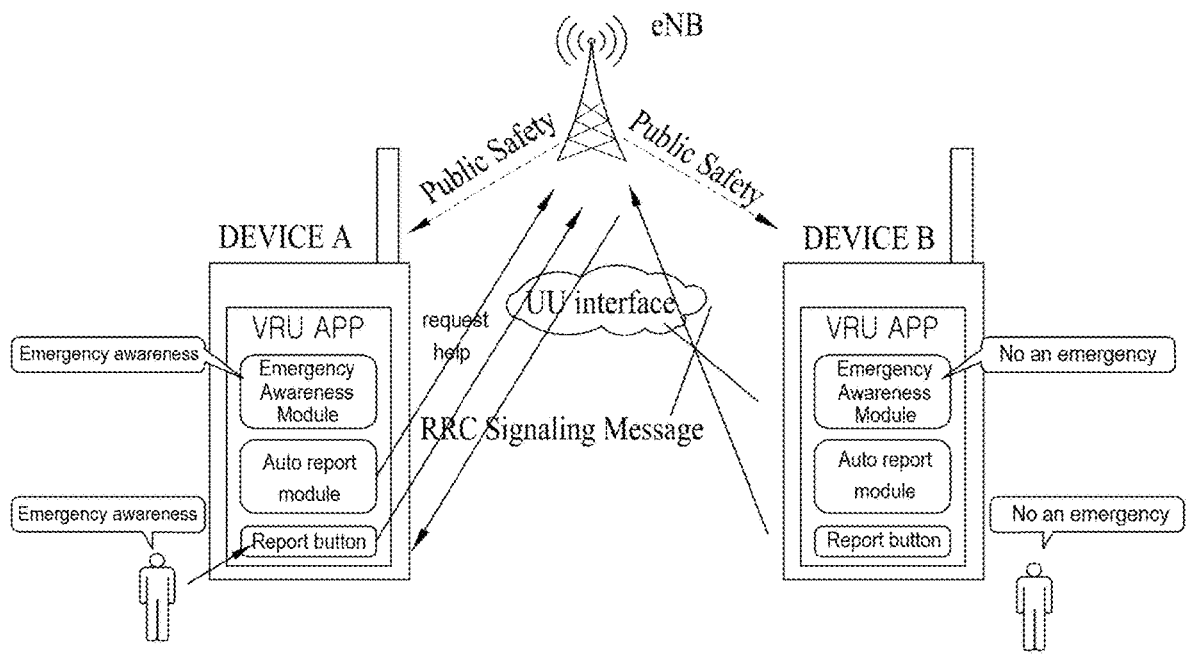
FIG. 17 is a diagram illustrating a method for changing a transmission parameter for message transmission by a VRU by detecting a risk zone.
Figure 17:
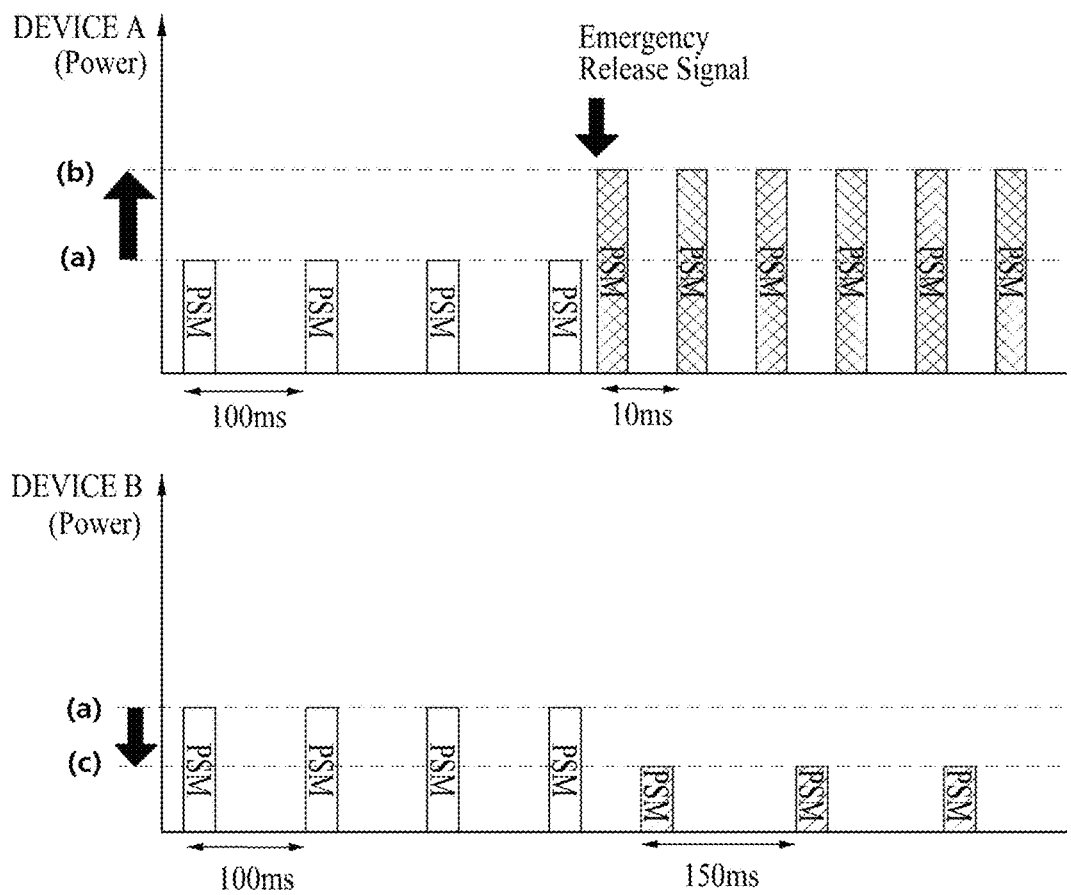

Referring to FIG. 17, each of a first VRU (device A) and a second VRU (device B) may include a VRU application including an emergency recognition module and an automatic report module.

The first VRU may detect or recognize that it is in a risk situation or risk zone based on messages such as a cooperative awareness message (CAM), a decentralized environmental notification message (DENM), and a threat notification message (TNM) received from the outside, and/or by sensors. When a risk is detected, the first VRU may transmit a control signal including risk information about the risk situation to the eNB, and receive information about reconfigured transmission parameters from the eNB. Specifically, in response to the control signal, the first VRU may receive reconfiguration information about a shorter transmission interval for the PSM and/or higher transmission power (or reconfiguration information allowing transmission of the PSM at the maximum transmission power) from the eNB. For example, the first VRU may transmit the PSM at a first transmission power a at an interval of 100 ms before detecting the risk situation, and transmit the PSM at a second transmission power b at an interval of 10 ms when the control signal is transmitted according to detection of the risk situation. Alternatively, when the control signal is transmitted, the first VRU may directly reset or change the transmission parameters to preconfigured transmission parameters (the second transmission power b, the transmission interval of 10 ms). Here, the second transmission power may be the maximum transmission power that the first VRU may set.

Alternatively, the second VRU may detect or recognize that it is in a risk situation or a risk zone based on a message such as CAM, DENM, TNM, or the like received from the outside and/or sensors. The second VRU may recognize that it is not in a risk zone or a risk situation based on the message or the sensors. When the transmission parameters of the first VRU are reconfigured due to the risk situation, the second VRU may receive reconfiguration information about the transmission parameters from the eNB, and transmit a PSM according to the transmission parameters corresponding to the reconfiguration information. For example, the second VRU may transmit the PSM at the first transmission power a at a transmission interval of 100 ms. Then, when it receives the reconfiguration information, the second VRU may transmit the PSM at a third transmission power c at a transmission interval of 150 ms. Alternatively, upon receiving a control signal broadcast by the first VRU, the second VRU may change the transmission parameters to preconfigured transmission parameters (the third transmission power c, the transmission interval of 150 ms). Here, the third transmission power may be the minimum transmission power that the second VRU may set.

Alternatively, the control signal may include fields or bit values according to Table 7 below.

gency information and VRU intention included in the control signal, and may adjust the transmission interval of PC5 or UU based on sps-AssistanceInformation information included in the control signal, the transmission period. In addition, the eNB may adjust the transmission interval and/or transmission power based on the control information and/or the determined priority. For example, the eNB may determine the degree to which the transmission interval is to be shortened or the degree to which the transmission power is to be increased, based on the control information and/or the determined priority. In addition, the eNB may transmit reconfiguration information about transmission parameters, such as a transmission interval and a transmission power to the other VRUs that have not transmitted the control signal. For example, the eNB may transmit, to the other VRUs, the reconfiguration information for reducing the transmission power while increasing the transmission interval for the other VRUs.

The transmission factors (or transmission parameters) reconfigured by the eNB may be indicated or transmitted to the VRU or the other VRUs by a higher layer signal using RRC connection reconfiguration according to standard document TS36.331. Specific parameters may be defined according to Table 8 below.

TABLE 8

| RRCConnectionReconfiguration(eNB->UE) | |
| --- | --- |
| Cause | Mode(0) |
| | Emergency(1) |
| SPS-ConfigSL | semiPersistSchedIntervalSL |
| SPS-ConfigUL | semiPersistSchedIntervalUL |
| | p0-Persistent |
| | {p0-NominalPUSCH-Persistent |
| | p0-UE-PUSCH-Persistent} |
| SL-CommResourcePool | SL-TxParameters |
| | {alpha P0} |

When the VRU receives the RRC connection reconfiguration according to Table 8, the access layer may transmit the values of the changed transmission factors (or transmission parameters) to a higher layer, and the higher layer may adjust the transmission parameters with reference to the values to transmit the PSM.

TABLE 7

| UEAssistanceInformation(UE->eNB) | | |
| --- | --- | --- |
| Emergency Mode | False(0) | |
| | True(1) | |
| Emergency Cause | Public Safety Center(0) | |
| | Personal Emergency(1) | |
| Emergency Details | Velocity | |
| | PersonalAssistive | unavailable (0), otherType (1), vision (2), hearing (3), movement (4), cognition (5) |
| | PersonalDeviceUserType | unavailable (0), aPEDESTRIAN (1), aPEDALCYCLIST (2), aPUBLICSAFETYWORKER (3), anANIMAL (4) |
| | PropelledInformation | Human(0), Animal(1), Motor(2) |
| VRU Intention | Unknown(0) | |
| | Ready to cross(1) | |
| | Crossing the street(2) | |
| | Far from driveway(3) | |
| | Working on road(4) | |
| sps-AssistanceInformation | trafficPatternListSL(for PC5) | |
| | trafficPatternListUL(for UU) | |

Figure 18:
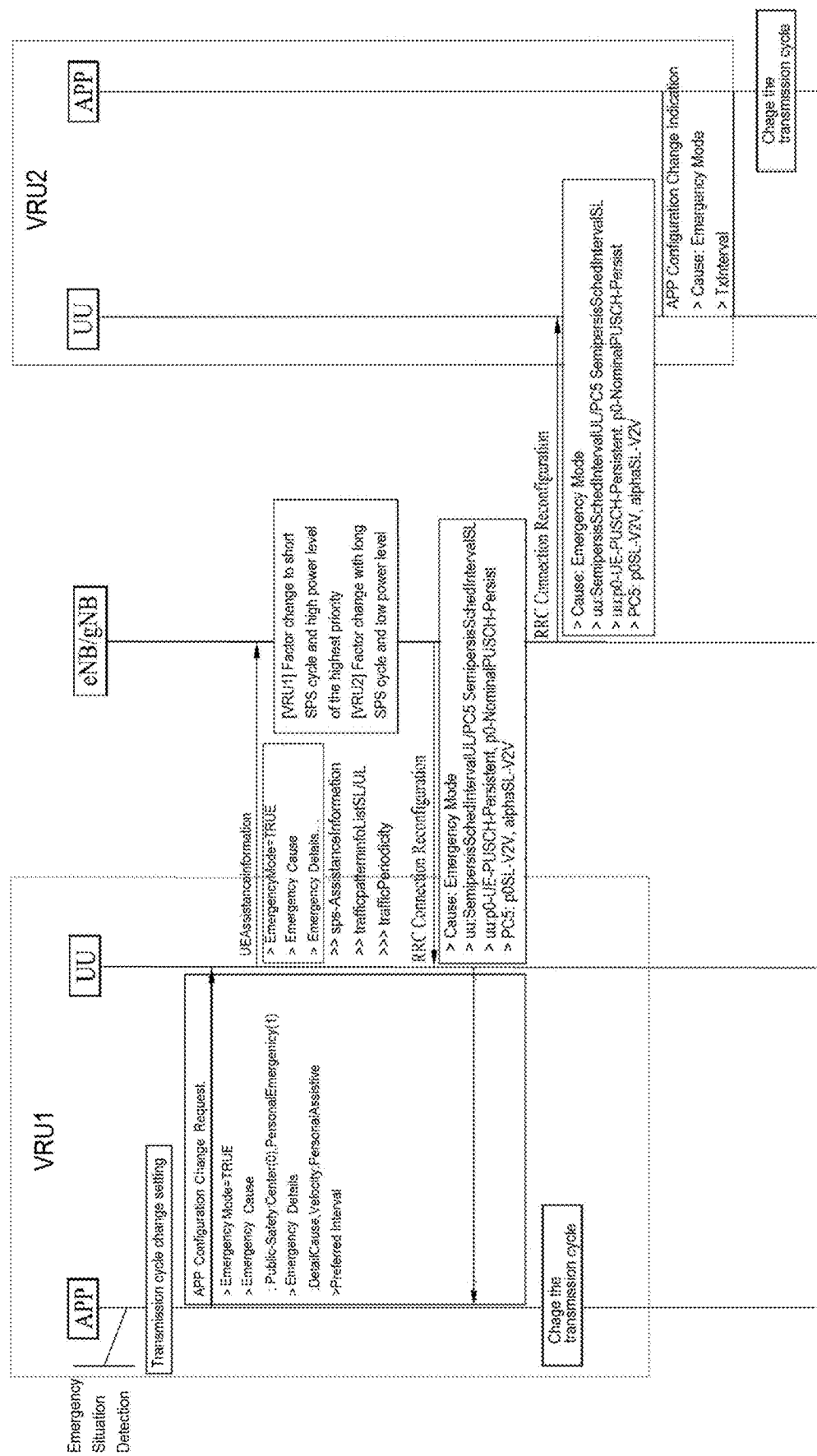
FIG. 18 is a diagram illustrating a method for transmitting a PSM by a VRU based on risk detection.

Upon receiving the control signal from the VRU, the eNB may determine a priority for the VRU based on the emer- FIG. 18 is a diagram illustrating a method for transmitting a PSM by a VRU based on risk detection.

Referring to FIG. 18, when the VRU recognizes a risk situation (or receives information about the risk situation), the V2X application may deliver, to the access layer, information about the risk situation (emergency mode=TRUE), a preferred transmission interval (preferredInterval), an emergency cause (Public Safety Center(0) or Personal Emergency(1)), emergency details (Velocity, PersonalAssistive: unavailable (0), otherType (1), vision (2), hearing (3), movement (4), cognition (5)), VRU type information (PersonalDeviceUserType: unavailable (0), aPEDESTRIAN (1), aPEDALCYCLIST (2), aPUBLICSAFETYWORKER (3), anANIMAL (4)), power information (PropelledInformation: Human(0), Animal(1), Motor(2)), and/or the state of the VRU to the access layer. The access layer may transmit an RRC control message (UEAssistanceInformation) including the information received from the V2X application to the eNB/gNB.

Next, when the eNB/gNB receives an RRC control message indicating the emergency mode, it may reset or change the transmission power (p0-UE-PUSCH-Persistent or p0-NominalPUSCH-Persistent for the uu interface/p0SL-V2V or alphaSL-V2V for the PC5 interface) and SemiPersistSchedInterval (SemiPersistSchedIntervalUL for the uu-interface/SemiPersistSchedIntervalSL for the PC5 interface) related to the VRU to a transmission interval shorter than or equal to the requested interval. Alternatively, when radio resources are insufficient, the eNB/gNB may adjust the priority of the VRU based on the risk information included in the RRC control message. The eNB/gNB may transmit RRC connection reconfiguration including reconfiguration information about the changed factors (or transmission parameters) to the VRU (or UE).

The VRU may transmit a message (PSM) including VRU information based on the transmission parameters reconfigured based on the received reconfiguration information. Specifically, the VRU may inform the V2X application that the reconfiguration information is reconfiguration information according to risk situation, and the V2X application may transmit VRU information or a PSM based on p0 the parameter information (e.g., p0-UE-PUSCH-Persistent, p0-NominalPUSCH-Persistent, and SemiPersistSchedIntervalUL for the uu interface or p0SL-V2V, alphaSL-V2V, and SemiPersistSchedIntervalSL for the PC5 interface) included in the reconfiguration information.

In addition, in order to protect a message of the VRU that has transmitted the RRC control message, the eNB/gNB may reconfigure even the transmission factors (or transmission parameters) for other VRUs for which an emergency is not detected (i.e., UEs or VRUs that have not transmitted the RRC control message). For example, the eNB/gNB may transmit, to the other UEs or the other VRUs, an RRC connection reconfiguration for reconfiguring the transmission parameters for the other VRUs while reconfiguring the transmission parameters for the UE or VRU that has transmitted the RRC control message. In this case, the other VRUs may transmit the PSM at a longer transmission interval and/or at a lower transmission power configured by the RRC connection reconfiguration. Also, the RRC connection reconfiguration transmitted to the other VRUs may include information indicating that it is triggered by a risk situation for the VRU that has transmitted the RRC control message.

Alternatively, transmission factors or transmission parameters related to the RRC connection reconfiguration may be defined as shown in Table 9 below.

TABLE 9

```
SPS-ConfigUL ::= CHOICE {
    release                   NULL,
    setup                     SEQUENCE {
        semiPersistSchedIntervalUL          ENUMERATED {
                                                sf10, sf20, sf32, sf40, sf64,
                                                sf80, sf128, sf160, sf320, sf640,
                                                sf1-v1430, sf2-v1430, sf3-v1430,
                                                sf4-v1430, sf5-v1430, spare1},
        implicitReleaseAfter                ENUMERATED {e2, e3, e4,
                                                e8},
        p0-Persistent                       SEQUENCE {
            p0-NominalPUSCH-Persistent      INTEGER (-126..24),
            p0-UE-PUSCH-Persistent          INTEGER (-8..7)
        }     OPTIONAL,                        -- Need OP
        ■
        ■
        ■
        ■
        ■
        ■
    }
}
SPS-ConfigSL-r14 ::= SEQUENCE {
    sps-ConfigIndex-r14               SPS-ConfigIndex-r14,
    semiPersistSchedIntervalSL-r14    ENUMERATED {
        sf20, sf50, sf100, sf200, sf300, sf400,
        sf500, sf600, sf700, sf800, sf900, sf1000,
        spare4, spare3, spare2, spare1}
}
SL-TxParameters-r12 ::=               SEQUENCE {
    alpha-r12                         Alpha-r12,
    p0-r12                            P0-SL-r12
}
P0-SL-r12 ::=                         INTEGER (-126..31)
Alpha-r12 ::=                         ENUMERATED (al0, al04, al05,
al06, al07, al08, al09, al1}
```

More specifically, the eNB may adjust the transmission power of a signal related to the uU interface by resetting $P_{O\_PUSCH,c}(1)$ in Equation 1 below.

$$P_{PUSCH,c}(i) = \min\{P_{CMAX,c}(i), P_{O\_PUSCH,c}(l) + \alpha_c(l) \cdot PL_c + f_c(i)\}$$ [Equation 1]

Specifically, the transmission power of the signal (i.e., PUSCH) related to the uU interface according to Equation 1 may be adjusted by changing the value of $P_{O\_PUSCH,c}(1)$ by adjusting the values of $P_{O\_UE\_PUSCHc2}(1)$ and $P_{O\_NOMINAL\_PUSCHc2}(1)$ according to Equation 2. Here, the factor value for $P_{O\_NOMINAL\_PUSCHc2}(1)$ may be indicated by NominalPUSCH-Persistent in the RRC connection reconfiguration, and the factor value of $P_{O\_UE\_PUSCHc2}(1)$ may be indicated by p0-UE-PUSCH-Persistent of the RRC connection reconfiguration.

$$P_{O\_PUSCH,c}(l) = P_{O\_PUSCH,c,2}(l) + P_{O\_NOMINAL\_PUSCH,c,2}(l)$$ [Equation 2]

Alternatively, the eNB may adjust the transmission power of the sidelink signal (PSSCH) related to the PC5 interface by resetting the values of $P_{O\_PSSCH,3}$ and $\alpha_{PSSCH,3}$ in Equation 3 given below. Here, $P_{O\_PSSCH,3}$ may be indicated by p0SL-V2V in the RRC connection reconfiguration, and $\alpha_{PSSCH,3}$ may be indicated by alphaSL-V2V in the RRC connection reconfiguration.

$$P_{PSSCH} = 10\log_{10}\left(\frac{M_{PSSCH}}{M_{PSSCH} + 10^{\frac{3}{10}} \times M_{PSCCH}}\right) +$$

$$\min\left\{P_{CMAX}, 10\log_{10}\left(M_{PSSCH} + 10^{\frac{3}{10}} \times M_{PSCCH}\right) + P_{O\_PSSCH,3} + \alpha_{PSSCH,3} \cdot PL\right\}$$ [Equation 3]

Figure 19:
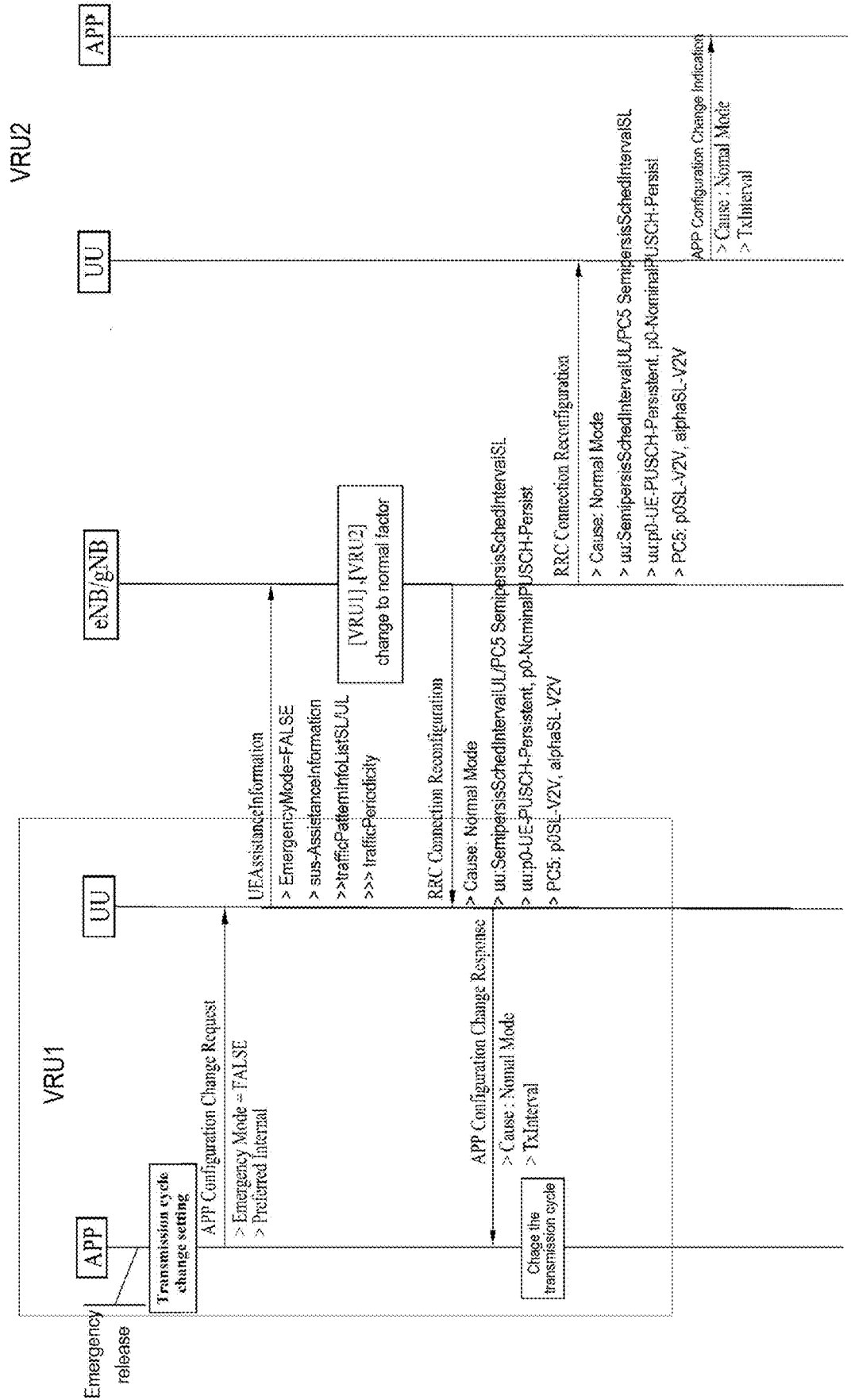
FIG. 19 is a diagram illustrating a method for changing transmission parameters when a VRU detects the release of an emergency.

FIG. 19 is a diagram illustrating a method for changing transmission parameters when a VRU detects release of an emergency.

Referring to FIG. 19, the VRU may detect the end or release of a risk situation. In this case, the V2X application may inform the access layer of the release of the emergency (emergency mode=FALSE). The access layer configures the minimum transmission interval (preferredInterval) to be changed and a field indicating release of the emergency (emergency mode=FALSE) in the RRC control message (UEAssistanceInformation) and transmits the same to the eNB/gNB. The eNB changes the configuration of the VRU according to the normal situation and transmits the same together with the cause of the change to the VRU through the RRC connection reconfiguration. Other VRUs whose transmission factors or transmission parameters have been changed due to an emergency may also be reconfigured with the transmission parameters for the normal situation.

As described above, according to the proposed disclosure, when a VRU performing a periodic operation independently according to conventional technology receives a real-time public safety warning according to a zone or detects an emergency, it may actively provide the VRU state, detailed situation information, and a transmission related factor desired to be changed to the eNB. In this case, the VRU may increase transmission efficiency of the PSM by transmitting a message based on the information about the appropriately reconfigured transmission parameter for the risk situation from the eNB. In addition, the eNB may efficiently change the access layer transmission factors for other UEs within the coverage by determining the highest priority. Thereby, it may ensure the safety of not only the VRU in risk but also the nearby VRUs/vehicles, and contribute to reducing the waste of radio resources and the interference.

FIG. 20 is a flowchart illustrating a method for transmitting a safety message by a VRU.

Referring to FIG. 20, the VRU may collect information on the surrounding environment, and evaluate or detect the possibility of occurrence of a risk situation based on the collected information on the surrounding environment and mobility information about the VRU (S901). Here, the information on the surrounding environment may be acquired from at least one of a cooperative awareness message (CAM), a decentralized environmental notification message (DENM), and a threat notification message (TNM) received from nearby UEs or devices. Alternatively, the information on the surrounding environment may be acquired from state information determined by the VRU public safety service center or information about a risk zone. For example, the VRU may acquire, from a message received from a nearby UE or device, mobility information, information about whether an accident has occurred in a specific area, information about whether the nearby UE or device is an emergency vehicle, road condition information, etc., and detect the risk situation by determining a correlation between the mobility information about the VRU, such as a movement path, or geographic information about the VRU and the acquired information. Alternatively, the VRU may detect the possibility of occurrence of a risk by determining whether it has entered a specific risk zone according to the state information received from the VRU public safety service center.

Next, when a risk situation is sensed, the VRU may transmit state information indicating the risk situation to the BS or the network (S903). The VRU may include, in the state information, information indicating that the VRU is in a risk situation, the cause of the occurrence of the risk situation, prediction information about the risk situation, and the like, and transmit the same to the BS or the network. In addition, the VRU may include information on a transmission interval of a safety message to be reconfigured or information on the maximum allowable transmission power of the safety message in the state information. Alternatively, the state information may include transmission factors or transmission parameters as shown in Table 8.

Alternatively, when a risk situation is detected, the VRU may include the state information in a UEAssistanceInformation message used for legacy RRC signaling and deliver the same to the BS or the network. In this case, the VRU may deliver the state information through the existing UEAssistanceInformation message indicating the state of the VRU or UE without adding a new definition of the RRC control message of the existing communication standard. Thereby, an increase in complexity according to an additional definition of the RRC control message may be minimized, and a signaling load of a signal may be minimized while maintaining compatibility with existing UEs.

Alternatively, the VRU may make a request to the BS for changing the transmission parameters for the nearby VRUs based on the value of a channel busy rate/ratio (CBR) for the nearby VRUs. For example, when the CBR or channel occupancy ratio (CR), which is information about the ratio of radio resources occupied by nearby UEs or VRUs to the resources or resource pool related to a safety message, is greater than or equal to a preset threshold, the VRU may make a request to the BS for reconfiguring the transmission parameters for the nearby UEs or nearby VRUs in order to prevent interference with the safety message of the VRU or to use resources smoothly. In this case, the transmission interval of the safety message of the nearby VRUs may be increased by the reconfiguration information, and the transmission power of the nearby VRUs may be decreased. That is, the request for the reconfiguration may be a request that the transmission interval of the safety message of the nearby VRUs or nearby UEs should be reset to the maximum value and the transmission power thereof should be reset to the minimum value.

Next, in response to the state information, the VRU may receive reconfiguration information for reconfiguring the transmission parameters of the safety message from the BS (S905). The reconfiguration information may include information for reconfiguring transmission factors or transmission parameters related to the transmission power and/or transmission interval of the safety message. For example, according to the reconfiguration information, the VRU may transmit the safety message at a transmission interval shorter than the transmission interval of the safety message configured before the risk situation is detected. Also, the safety message may be transmitted at a transmission power greater than the transmission power of the safety message configured before the risk situation is detected.

Alternatively, the minimum value of the transmission power of the safety message may be adjusted for the VRU based on the reconfiguration information. For example, the minimum value of the transmission power of the VRU may be reset according to the reconfiguration information, and the reset minimum value may be greater than the previous minimum value. Thereby, transmission of the safety message at a transmission power greater than the previously set transmission power may be ensured for the VRU. In other words, the VRU may determine a transmission power greater than the existing one as the transmission power for the safety message according to increase in the minimum value of the transmission power according to the reconfiguration information. Alternatively, the minimum value of the transmission power for the safety message may be set to a value corresponding to the maximum transmission power for the VRU according to the reconfiguration information. In this case, the VRU may invariably transmit the safety message at the maximum transmission power in a risk situation.

Alternatively, the reconfiguration information may include information on a priority reconfigured based on the state information. In this case, the degree of increase of the minimum value of the transmission power and the degree of shortening of the transmission interval included in the reconfiguration information may be determined based on the priority.

Alternatively, the VRU may receive reconfiguration information according to a risk situation by an RRCConnectionReconfiguration message. That is, the VRU may receive the reconfiguration information through RRC signaling or higher layer signaling of the BS. In addition, according to the proposed embodiments, by using the RRCConnectionReconfiguration message related to reconfiguration of the parameters of the VRU without adding a new definition of the RRC control message of the existing communication standard, complexity of the RRC control message may be minimized, and the signaling load of the signal may be minimized while maintaining compatibility.

Alternatively, for the VRU, the increased minimum value of the transmission power for the safety message may be reset based on the parameter values of p0-UE-PUSCH-Persistent and p0-NominalPUSCH-Persistent included in the reconfiguration information (or parameter values of the RRC control message). In this case, the reset minimum value may be a value increased from the minimum value set before the risk situation occurs. That is, the VRU may reset the transmission power for the safety message according to parameter values of p0-UE-PUSCH-Persistent and p0-NominalPUSCH-Persistent for increasing the transmission power of the safety message.

Specifically, referring to Equations 1 and 2, the parameter values of p0-UE-PUSCH-Persistent and p0-NominalPUSCH-Persistent are indicated by an RRC control signal in order to determine the minimum value of the PUSCH transmission power. The parameter values of p0-UE-PUSCH-Persistent and p0-NominalPUSCH-Persistent included in the reconfiguration information are reset to increase the minimum value of the transmission power for the PUSCH from the value set before a risk situation is detected. In this case, the transmission power for the safety message may be determined to be higher than the existing transmission power set before the risk is detected. For example, the parameter values of p0-UE-PUSCH-Persistent and p0-NominalPUSCH-Persistent included in the reconfiguration information may be set to determine the transmission power for the PUSCH as a value equal to $P_{CMAX}$ or a value close to $P_{CMAX}$ in Equations 1 and 2 above. In this case, the VRU may transmit the safety message at a transmission power equal to or close to $P_{CMAX}$ by resetting of the parameter values of p0-UE-PUSCH-Persistent and p0-NominalPUSCH-Persistent included in the reconfiguration information.

Alternatively, the VRU may reset the minimum value of the transmission power for the safety message based on the parameter values of p0SL-V2V and alphaSL-V2V (or the parameter value of the RRC control message) included in the reconfiguration information. In this case, the reset minimum value may be a value increased from the minimum value set before the risk situation occurs. That is, the VRU may reset the transmission power for the safety message according to the parameter values of p0SL-V2V and alphaSL-V2V for increasing the transmission power (or the minimum value thereof) for the safety message.

Specifically, referring to Equation 3, the parameter values of p0SL-V2V and alphaSL-V2V are values indicated by the RRC control signal to determine the minimum value of the transmission power for the PUSCH. The parameter values of p0SL-V2V and alphaSL-V2V included in the reconfiguration information may be reset to values for increasing the minimum value of the transmission power for the PUSCH compared to the value set before a risk situation is detected. In this case, the transmission power for the safety message may be determined to be higher than the existing transmission power set before the risk is detected. For example, the parameter values of p0p0SL-V2V and alphaSL-V2V included in the reconfiguration information may be set to determine the transmission power for the PUSCH as a value equal to $P_{CMAX}$ or a value close to $P_{CMAX}$ in Equation 3. In other words, according to the parameter values of p0SL-V2V and alphaSL-V2V indicated by the reconfiguration information, the VRU may invariably set or determine the term 'min{ }' of the transmission power for the PSSCH (or the safety message) determined by Equation 3 to be $P_{CMAX}$. In this case, the VRU may transmit the safety message at a transmission power equal to or close to $P_{CMAX}$ by resetting of the parameter values of p0p0SL-V2V and alphaSL-V2V included in the reconfiguration information.

Alternatively, the transmission interval for the safety message may be reset to the shortest transmission interval among a plurality of transmission intervals that the BS may set for the VRU according to the reconfiguration information. In addition, the reconfiguration information may include both information for resetting the transmission power and information for resetting the transmission interval.

Next, the VRU may transmit a safety message according to transmission parameters reconfigured according to the received reconfiguration information. In this case, based on the reconfiguration information, the VRU may transmit the safety message at a higher transmission power than when a risk situation is not detected, or repeatedly transmit the safety message at a shorter interval than when the risk situation is not detected (S907).

Alternatively, when the VRU detects that the VRU has escaped from the detected risk situation or that the detected risk situation has ended, the VRU may transmit release information related to the release of the risk situation to the BS. In this case, the VRU may receive transmission parameter reconfiguration information according to the release of the risk situation from the BS. The reconfiguration information may include reconfiguration information for returning the increased transmission power or the reduced transmission interval to the previous transmission power or the previous transmission interval configured before the occurrence of the risk situation.

Figure 21:
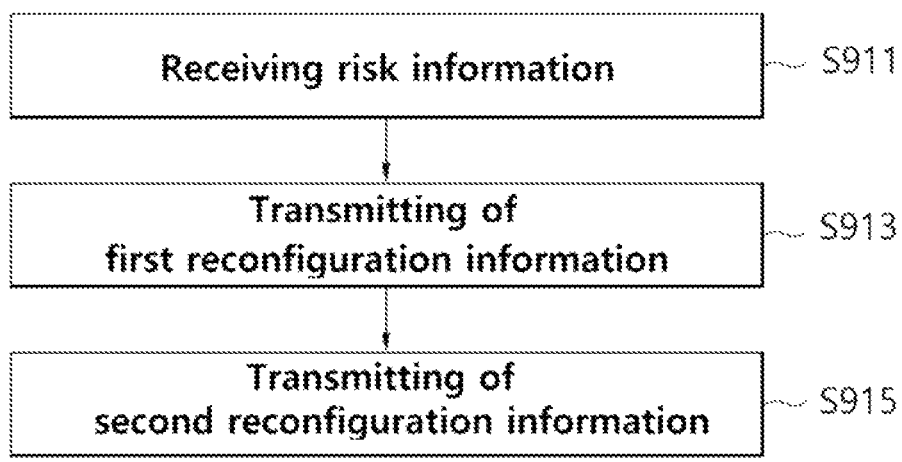
FIG. 21 is a flowchart illustrating a method for reconfiguring, by a base station, a transmission parameter related to a safety message of a VRU.

FIG. 21 is a flowchart illustrating a method for reconfiguring, by a base station, a transmission parameter related to a safety message of a VRU.

Referring to FIG. 21, the BS or the network may receive state information according to detection of a risk situation from a first VRU (S911). Here, the state information may include detailed information on the detected risk situation, such as information indicating that the first VRU is in a risk situation, a cause of the risk situation, and prediction information about the risk situation.

Alternatively, the BS may receive the state information by an RRC control message. For example, the state information may be included in an existing UEAssistanceInformation message through which information related to a UE or a VRU is transmitted and transmitted to the BS.

Alternatively, the state information may further include information requesting that transmission parameters of a nearby VRU or a nearby UE present in a position that may cause interference with the safety message of the first VRU should be reconfigured.

Next, the BS may determine a value of an increase (offset) of the transmission power for the safety message to be transmitted by the first VRU based on the received state information, and a value of a decrease of the transmission interval of the safety message to be transmitted by the first VRU (S913).

Specifically, the BS may transmit reconfiguration information for increasing the minimum value of transmission power for the safety message or shortening the transmission interval of the safety message to the first VRU. In this case, the first VRU may be ensured to transmit the safety message at a higher transmission power than before by increasing the minimum value of the transmission power of the safety message according to the reconfiguration information. Alternatively, the BS may reset the minimum value of the transmission power for the first VRU such that the minimum value of the transmission power for the safety message corresponds to the maximum transmission power. In this case, the first VRU may transmit the safety message at the maximum transmission power for a predetermined period in a risk situation.

Alternatively, the BS may reconfigure a priority related to transmission of the safety message based on the state information, and transmit the reconfiguration information including the reconfigured priority information to the first VRU. In addition, the BS may determine the transmission power and transmission interval corresponding to the reconfigured priority (or determine the transmission power and transmission interval based on a mapping table of the priority, the transmission interval, and the transmission power), and transmit the reconfiguration information including information on the determined transmission power and transmission interval to the first VRU.

Alternatively, the BS may change the parameter values of p0-UE-PUSCH-Persistent and p0-NominalPUSCH-Persistent (or parameter values of the RRC control message), and transmit the reconfiguration information including the changed parameter values of p0-UE-PUSCH-Persistent and p0-NominalPUSCH-Persistent to the first VRU. As described above, the BS may reset the minimum value of the transmission power for the safety message by changing the parameter values of p0-UE-PUSCH-Persistent and p0-NominalPUSCH-Persistent for the first VRU through the reconfiguration information. Here, the reset minimum value may be greater than the minimum value set for the first VRU before the state information is received.

Specifically, referring to Equations 1 and 2, the values of p0-UE-PUSCH-Persistent and p0-NominalPUSCH-Persistent are indicated by an RRC control signal to determine the minimum value of transmission power for the PUSCH. That is, the BS may reset the parameter values of p0-UE-PUSCH-Persistent and p0-NominalPUSCH-Persistent such that the minimum value of the transmission power of the safety message of the first VRU is increased. For example, the BS may determine the parameter values of p0-UE-PUSCH-Persistent and p0-NominalPUSCH-Persistent such that the transmission power for the PUSCH is determined to be $P_{CMAX}$ or a value close to $P_{CMAX}$ in Equations 1 and 2.

Alternatively, the BS may change the parameter values of p0p0SL-V2V and alphaSL-V2V (or the parameter values of the RRC control message), and transmit the reconfiguration information including the changed parameter values of p0SL-V2V and alphaSL-V2V to the first VRU. As described above, the BS may reset the minimum value of the transmission power for the safety message by changing the parameter values of p0p0SL-V2V and alphaSL-V2V for the first VRU through the reconfiguration information. Here, the reset minimum value may be greater than the minimum value set for the first VRU before the state information is received.

Specifically, referring to Equation 3, the parameter values of p0SL-V2V and alphaSL-V2V are values indicated by the RRC control signal to determine the minimum value of the transmission power for the PSSCH. That is, the BS can increase the minimum value of the transmission power for the safety message of the first VRU by adjusting the parameter values of p0SL-V2V and alphaSL-V2V. For example, the BS may determine the parameter values of p0SL-V2V and alphaSL-V2V such that the term 'min{ }' of the transmission power for the PSSCH in Equation 3 is always $P_{CMAX}$.

The BS may recognize an interface via which the first VRU transmits a safety message based on the state information. When the safety message is transmitted via the uU interface, the BS may change the parameter values of p0-UE-PUSCH-Persistent and p0-NominalPUSCH-Persistent. When the safety message is transmitted via the PC5 interface, the BS may change the parameter values of p0SL-V2V and alphaSL-V2V.

Alternatively, the BS may change the transmission interval for the safety message to the shortest interval among a plurality of transmission intervals that may be configured for the VRU. For example, the BS may transmit, to the first VRU, reconfiguration information for resetting the transmission interval of the safety message to the shortest transmission interval among the plurality of transmission intervals.

In addition, the BS may transmit, to the second VRU, second reconfiguration information for resetting the transmission parameters of the safety message for the second VRU, which is another VRU that has not transmitted the state information within a specific coverage (S915). Specifically, the BS may acquire information on the surrounding situation of the first VRU (resource occupancy information such as CBR or CR, or congestion information about the VRU), and reconfigure transmission parameters of the safety message for the second VRU that has not transmitted the state information unlike the first VRU based on the acquired information on the surrounding situation. The BS may transmit the second reconfiguration information, which is information on the reconfigured transmission parameters, to the second VRU. The second VRU may be a plurality of other VRUs for which a risk situation is not detected in a geographic area adjacent to the first VRU.

Here, the second VRU may be a VRU that is located in a geographic area having the same zone ID as the zone ID related to the first VRU, but has not transmitted the state information, or a VRU that is located in an geographic area adjacent to a geographic area corresponding to the zone ID related to the first VRU, but has not transmitted the state information.

Here, the second reconfiguration information may reconfigure a parameter or transmission factor corresponding to the first reconfiguration information. The BS may increase the transmission interval of the safety message of the second VRU or decrease the transmission power of the safety message of the second VRU through the second reconfiguration information. For example, in order to protect transmission of the safety message of the first VRU to the maximum degree, the BS may transmit, to the second VRU, reconfiguration information for maximally increasing a transmission interval for the second VRU and reducing transmission power to the minimum value. In addition, the BS may further include information indicating reconfiguration of the transmission parameters according to the detection of a risk situation of the first VRU in the second reconfiguration information and transmit the information to the second VRU.

Next, when the BS receives information indicating release or termination of the detected risk situation from the first VRU, the BS transmit, to the first VRU and the second VRU, reconfiguration information for returning the transmission parameters for the first VRU and the transmission parameters for the second VRU to their original values.

Communication System Example to which the Present Disclosure is Applied

Although not limited thereto, various descriptions, functions, procedures, proposals, methods, and/or operational flow charts of the present disclosure disclosed in this document can be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

FIG. 20 illustrates a communication system applied to the present disclosure.

Referring to FIG. 20, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

FIG. 21 illustrates a wireless device applicable to the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, the VRU may include a processor 102 and a memory 104, which are connected to the RF transceiver. The memory 104 may include at least one program capable of performing operations related to the embodiments described with reference to FIGS. 15 to 21. The processor 102 may be configured to detect a risk situation based on the surrounding information acquired using the RF transceiver, transmit state information to the BS based on the detection of the risk situation, receive reconfiguration information about transmission parameters from the BS, and transmit a safety message based on the acquired reconfiguration information. Here, when the risk of collision is predicted according to the surrounding information and the mobility information, the state information may be included in a UEAssistanceInformation message and transmitted. The safety message may be transmitted at a transmission power and transmission interval changed by the reconfiguration information.

Alternatively, a chipset including the processor 102 and the memory 104 may be configured. The memory 104 may include at least one program capable of performing operations related to the embodiments described with reference to FIGS. 15 to 21. The processor 102 may transmit a safety message based on the at least one program stored in the memory.

In another aspect of the disclosure, a computer readable storage medium including at least one computer program that, when executed, causes the at least one processor to perform an operation may be provided. The operation may include detecting a risk situation based on the surrounding information acquired using the RF transceiver, transmitting state information to a BS based on the detection of the risk situation, receiving reconfiguration information about transmission parameters from the BS, and transmitting a safety message based on the acquired reconfiguration information. Here, the state information may be included in the UEAssistanceInformation message and transmitted when the risk of collision is predicted according to the surrounding information and the mobility information. The safety message may be transmitted at a transmission power and transmission interval changed by the reconfiguration information.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Specifically, the second wireless device, the base station, may include a processor 202 and a memory 204, which are connected to the RF transceiver. The memory 204 may include at least one program capable of performing operations related to the embodiments described with reference to FIGS. 15 to 21. The processor 202 may be configured to receive a UEAssistanceInformation message including state information for detection of the risk situation from a first vulnerable road user (VRU), transmit first reconfiguration information for reconfiguring transmission parameters for a safety message of the first VRU to the first VRU based on the state information, and transmit second reconfiguration information for reconfiguring transmission parameters for a safety message of the second VRU that has not transmitted the state information to the second VRU. Here, the first reconfiguration information may decrease the transmission interval of the safety message of the first VRU while increasing the transmission power of the safety message of the first VRU, and may increase the transmission interval for the safety message of the second VRU while reducing the transmission power for the safety message of the second VRU.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 22:
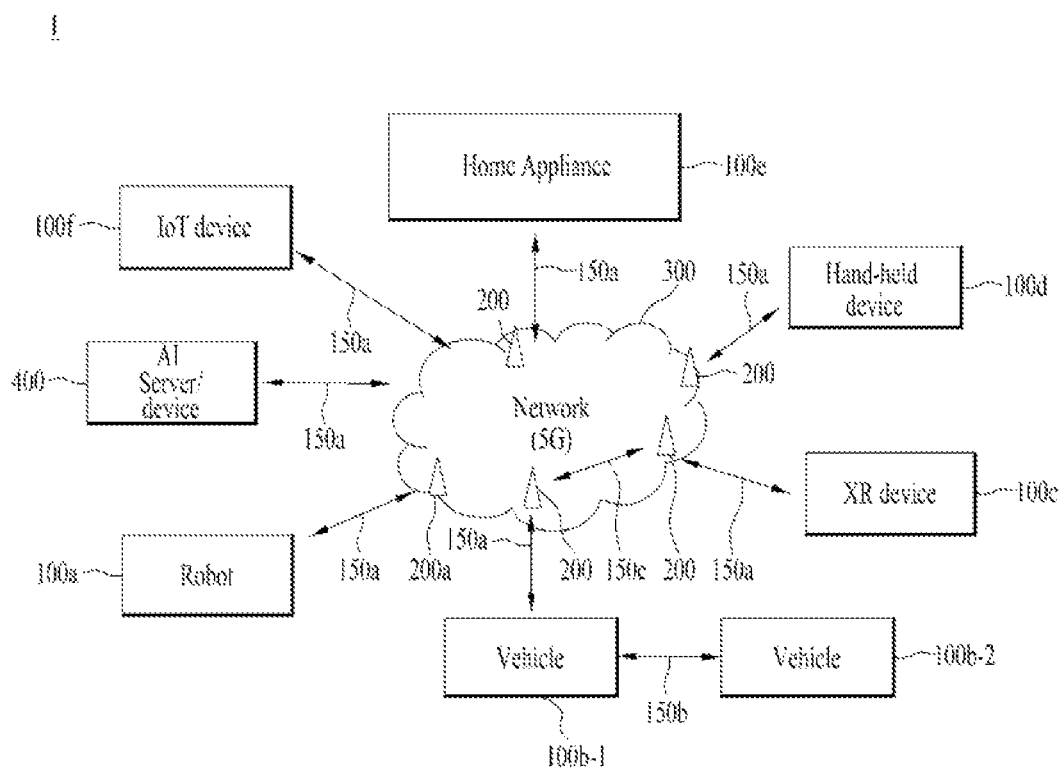
FIG. 22 illustrates a communication system applied to the present disclosure.

FIG. 22 illustrates another example of a wireless device applied to the present disclosure. The wireless device may be implemented in various forms according to a use-case/service (refer to FIG. 20)

Referring to FIG. 22, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. 20), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Examples of Mobile Devices to which the Present Disclosure is Applied

Figure 23:
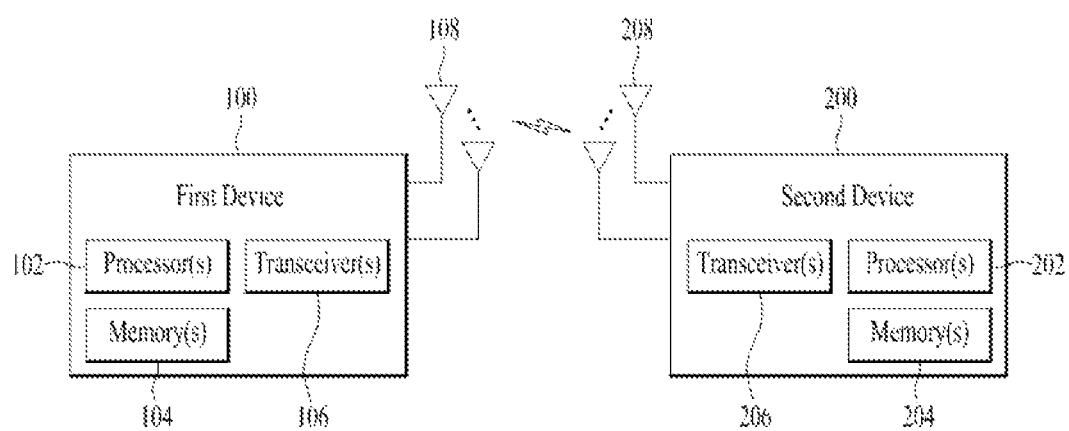
FIG. 23 illustrates wireless devices applicable to the present disclosure.

FIG. 23 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 23, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 24:
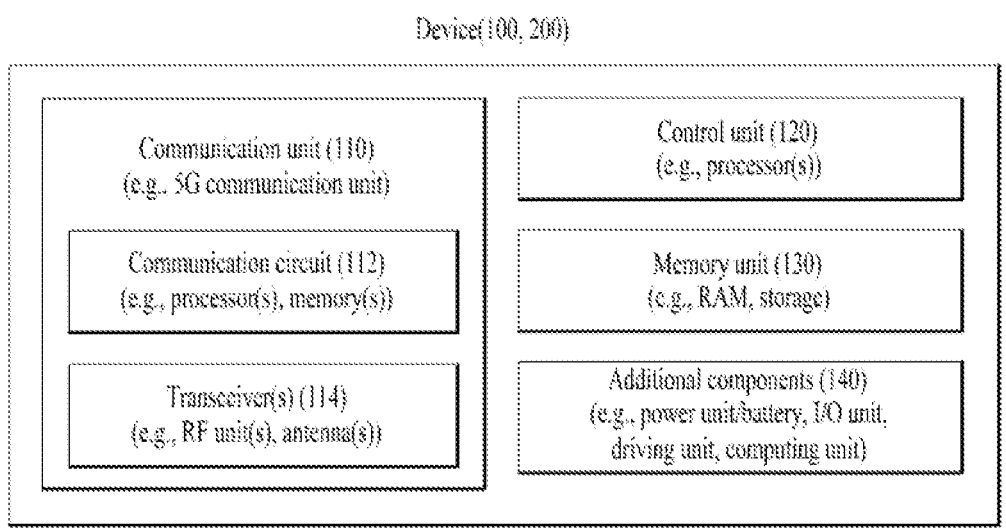
FIG. 24 illustrates another example of a wireless device to which the present disclosure is applied. The wireless device may be implemented in various forms according to use-examples/services.
Figure 25:
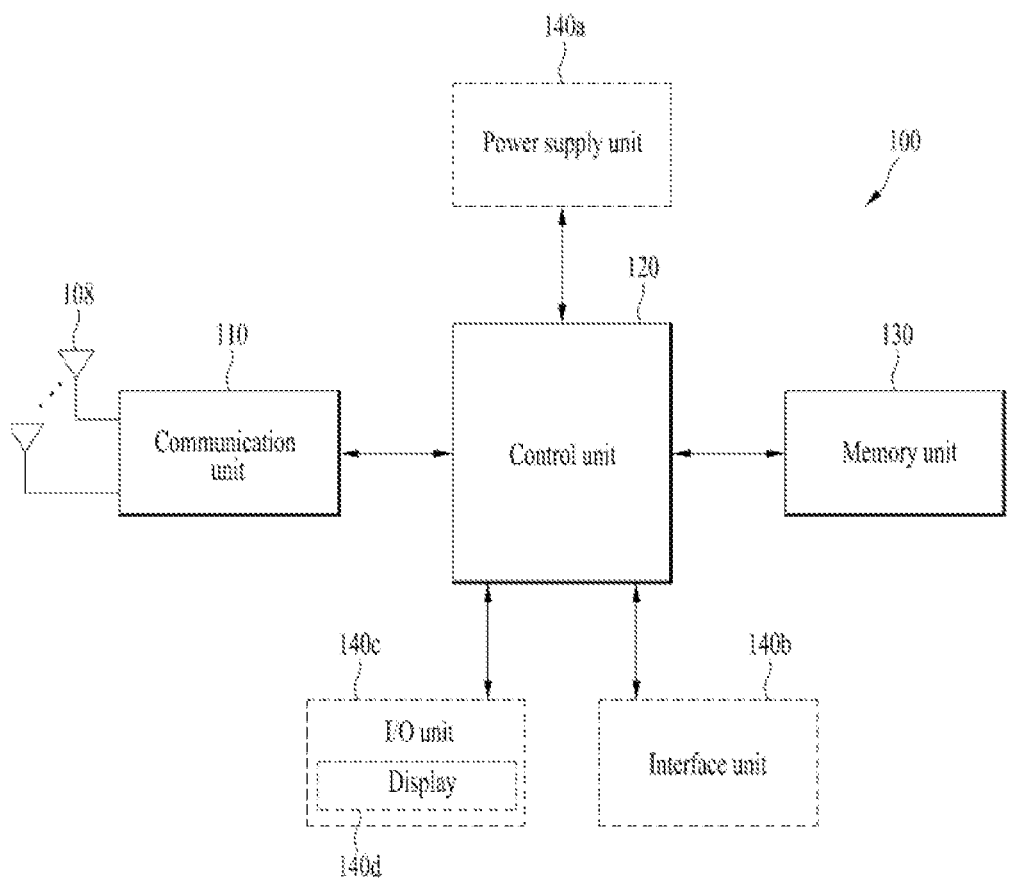
FIG. 25 illustrates a hand-held device applied to the present disclosure.
Figure 26:
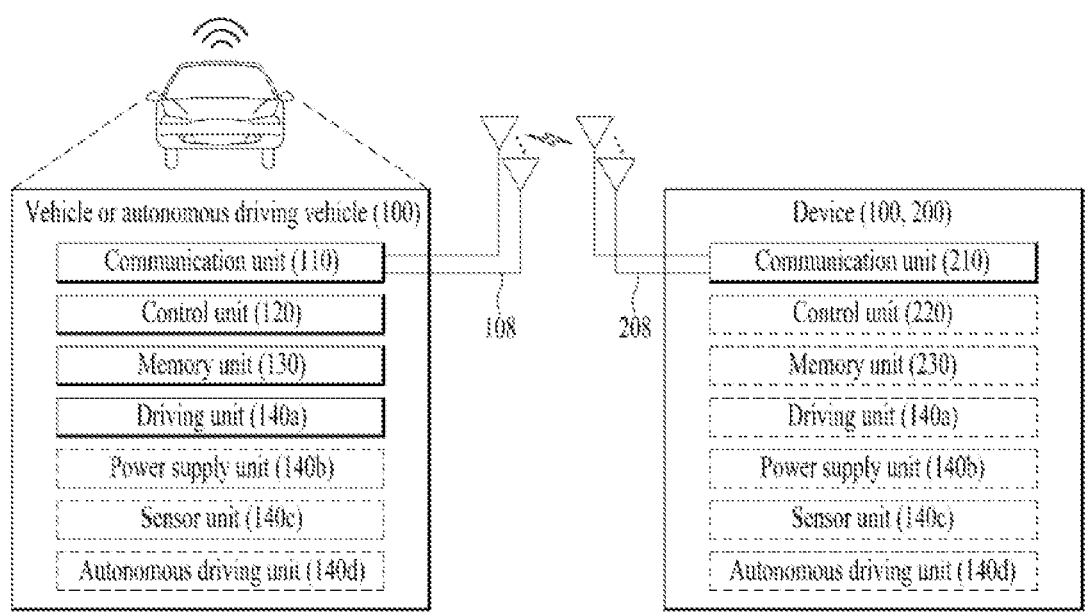
FIG. 26 illustrates a vehicle or an autonomous driving vehicle applied to the present disclosure.

Examples of Vehicles or Autonomous Vehicles to which the Present Disclosure is Applied FIG. 24 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 24, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 22, respectively The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

What is claimed is:

1. A method for transmitting a safety message by a vulnerable road user (VRU) device in a wireless communication system supporting sidelink, the method comprising:
transmitting state information to a device based on mobility information;
receiving reconfiguration information about transmission parameters from the device; and
transmitting a safety message based on the reconfiguration information, wherein the state information is included and transmitted in a UEAssistanceInformation message based on a prediction of a risk of collision according to surrounding information and the mobility information,
wherein the safety message is transmitted at a transmission power and transmission interval changed by the reconfiguration information.

2. The method of claim 1, wherein the transmission interval is reduced by the reconfiguration information, and
wherein the transmission power is increased by the reconfiguration information.

3. The method of claim 1, wherein the reconfiguration information increases a minimum value of the transmission power for the safety message.

4. The method of claim 1, wherein a minimum value of the transmission power for the safety message is changed to a value corresponding to a maximum value of the transmission power for the safety message by the reconfiguration information.

5. The method of claim 1, wherein the safety message is transmitted at a maximum transmission power by p0-UE-PUSCH-Persistent and p0-NominalPUSCH-Persistent included in the reconfiguration information.

6. The method of claim 1, wherein the safety message is transmitted at a maximum transmission power according to values of p0SL-V2V and alphaSL-V2V included in the reconfiguration information.

7. The method of claim 1, wherein the reconfiguration information is included in an RRCConnectionReconfiguration message and transmitted through RRC signaling.

8. The method of claim 1, wherein the transmission interval of the safety message is set to a shortest transmission interval among a plurality of transmission intervals configurable for the VRU by the device according to the reconfiguration information.

9. The method of claim 1, wherein the surrounding information is acquired from at least one of a cooperative awareness message (CAM), a decentralised environmental notification message (DENM), or a threat notification message (TNM).

10. The method of claim 1, wherein the surrounding information is acquired from a VRU public safety service center.

11. The method of claim 1, wherein the VRU device transmits the UEAssistanceInformation message including information indicating release of the risk situation to the device when the detected risk situation ends.

12. A method for reconfiguring a transmission parameter for a safety message by a device in a wireless communication system supporting sidelink, the method comprising:
   receiving, from a first vulnerable road user (VRU) device, state information indicating detection of a risk situation;
   transmitting, to the first VRU device, first reconfiguration information for reconfiguring a transmission parameter for a safety message of the first VRU device based on the state information; and
   transmitting, to a second VRU device, second reconfiguration information for reconfiguring a transmission parameter for a safety message of a second VRU device, the second VRU device not having transmitted the state information,
   wherein the state information is received through a UEAssistanceInformation message,
   wherein the first reconfiguration information decreases a transmission interval for the safety message of the first VRU device while increasing a transmission power for the safety message of the first VRU device, and
   wherein the second reconfiguration information increases a transmission interval for the safety message of the second VRU device while decreasing a transmission power for the safety message of the second VRU device.

13. A vulnerable road user (VRU) device for transmitting a safety message in a wireless communication system supporting sidelink, the VRU device comprising:
   a radio frequency (RF) transceiver; and
   a processor connected to the RF transceiver,
   wherein the processor is configured to:
   transmit state information to a device based on mobility information;
   receive reconfiguration information about transmission parameters from the device; and
   transmit a safety message based on the reconfiguration information,
   wherein the state information is included and transmitted in a UEAssistanceInformation message based on a prediction of a risk of collision according to surrounding information and the mobility information,
   wherein the safety message is transmitted at a transmission power and transmission interval changed by the reconfiguration information.

* * * * *